US012570183B2

(12) United States Patent
Bashir et al.

(10) Patent No.: US 12,570,183 B2
(45) Date of Patent: Mar. 10, 2026

(54) ADJUSTABLE SUPPORT FOR A SEAT SYSTEM

(71) Applicant: Adient US LLC, Plymouth, MI (US)

(72) Inventors: Raza Bashir, Sterling Heights, MI (US); John Gomez, Howell, MI (US); Joseph Gasko, Commerce Township, MI (US); Xin Wei Jolene Ng, Singapore (SG); Elizabeth Ann Allen, Ypsilanti, MI (US); John David Newberry, Van Buren Township, MI (US)

(73) Assignee: Adient US LLC, Plymouth, MI (US)

( * ) Notice: Subject to any disclaimer, the term of this patent is extended or adjusted under 35 U.S.C. 154(b) by 113 days.

(21) Appl. No.: 18/713,220

(22) PCT Filed: Nov. 30, 2022

(86) PCT No.: PCT/US2022/080607
§ 371 (c)(1),
(2) Date: May 24, 2024

(87) PCT Pub. No.: WO2023/102395
PCT Pub. Date: Jun. 8, 2023

(65) Prior Publication Data
US 2025/0033534 A1       Jan. 30, 2025

Related U.S. Application Data

(60) Provisional application No. 63/264,665, filed on Nov. 30, 2021.

(51) Int. Cl.
| | |
|---|---|
| B60N 2/02 | (2006.01) |
| B60N 2/58 | (2006.01) |
| B60N 2/62 | (2006.01) |
| B60N 2/70 | (2006.01) |
| *A47C 1/023* | (2006.01) |
| *B60N 2/68* | (2006.01) |
| *B60N 2/90* | (2018.01) |

(52) U.S. Cl.
CPC ....... B60N 2/0244 (2013.01); B60N 2/02253 (2023.08); B60N 2/0284 (2013.01);
(Continued)

(58) Field of Classification Search
CPC ........ B60N 2/0284; B60N 2/62; B60N 2/686; B60N 2/02246; B60N 2/995; A47C 1/023
See application file for complete search history.

(56) References Cited

U.S. PATENT DOCUMENTS 2,636,550 A     4/1953   Poyer
7,458,637 B2   12/2008   Norman et al.
(Continued)

FOREIGN PATENT DOCUMENTS

FR          2672855 A1     8/1992
WO      2008116180 A2     9/2008

OTHER PUBLICATIONS

European Patent Office, International Search Report and Written Opinion in Application No. PCT/US2022/080607, dated Mar. 30, 2023, 9 pages, Rijswijk, Netherlands.

*Primary Examiner* — Syed A Islam
(74) *Attorney, Agent, or Firm* — Marshall & Melhorn, LLC

(57) ABSTRACT

In one embodiment, a seat may have a seat base substrate that has a flexible main member. The seat may also have a drive mechanism that has a lower slide and an upper slide. The upper slide may selectively move with respect to the fixed lower slide via a rack and pinion system. The seat may also have a pusher releasably attached to the upper slide. The pusher may contact the flexible main member. The seat may also have a trim ring attached to the lower slide.

20 Claims, 33 Drawing Sheets

(52) U.S. Cl.
CPC ............. B60N 2/5825 (2013.01); B60N 2/62 (2013.01); B60N 2/7094 (2013.01); *A47C 1/023* (2013.01); *B60N 2/686* (2013.01); *B60N 2/995* (2018.02); *B60N 2210/40* (2023.08); *B60N 2220/20* (2023.08)

(56) References Cited

U.S. PATENT DOCUMENTS

| | | | | |
|---|---|---|---|---|
| 7,850,247 | B2 * | 12/2010 | Stauske | ................ B60N 2/0228 297/452.52 |
| 7,997,648 | B2 * | 8/2011 | Becker | ................ B60N 2/0284 297/284.11 |
| 8,162,397 | B2 | 4/2012 | Booth et al. | |
| 9,016,783 | B2 | 4/2015 | Line et al. | |
| 9,016,784 | B2 | 4/2015 | Line et al. | |
| 9,756,408 | B2 | 9/2017 | Ferretti et al. | |
| 9,809,132 | B2 * | 11/2017 | Bortolon | ................. B60N 2/62 |
| 9,902,293 | B2 | 2/2018 | Line et al. | |
| 10,611,277 | B2 | 4/2020 | Engelke et al. | |
| 10,640,011 | B2 | 5/2020 | Anzenberger et al. | |
| 11,059,407 | B2 * | 7/2021 | Tait | ...................... B60N 2/0284 |
| 11,420,546 | B2 * | 8/2022 | Oomen | ................. A47C 1/023 |
| 11,440,450 | B2 | 9/2022 | Seibold | |
| 2006/0061167 | A1 | 3/2006 | Adragna et al. | |
| 2009/0091172 | A1 | 4/2009 | Kim | |

* cited by examiner

Extended cusion length

Standard cusion length

Retracted cusion length

432

430

18

18

434

Width

+ 45mm or more

Standard seat length ~355-375mm

~17° from horiontal seat-base (cushion -thigh) angle

428

332 minus ~20mm or shorter

18

352

101

200

208

426

384

ADJUSTABLE SUPPORT FOR A SEAT SYSTEM

FIELD

The presently disclosed subject matter relates to a seat, and more particularly to an adjustable support for a seat.

BACKGROUND

Conventional seats, particularly those employed in a vehicle, include a seat back assembly connected to a seat base assembly and a headrest assembly. The seat base assembly may include a seat cushion length extender. Prior art seat cushion length extenders require multiple high-cost components. Further, the complexity of the prior art seat cushion length extenders requires intricate manufacturing processes which increases seat cost. For this reason, cushion extenders are typically only offered as an option in premium or high-end vehicles.

A further drawback of conventional seat cushion length extenders is that they only actuate a middle portion of the cushion which is supposed to accommodate taller occupants, but these systems do not necessarily extend across a wide enough portion of the cushion to accommodate for leg splay of the occupants. As such, the taller occupants, even with the typical seat cushion length extenders deployed, do not obtain optimized support and comfort rear of the knee when seated in a natural manner. There is also a need for the seat cushion length extenders to retract to provide smaller occupants appropriate leg support and leg clearance in order for the small occupant to bend their legs without interference.

In view of the disadvantages associated with the prior art, it would be advantageous to provide a seat cushion length extender that provides the possibility for full seat width comfort and accommodation for varying sizes of occupants, without part complexity, while maintaining an integrated appearance when trimmed. The new cushion length adjuster should also minimize expense and complexity of the prior art designs.

SUMMARY

In concordance and agreement with the present disclosure, an adjustable support for a seat, which simplifies manufacturability and decreases costs, while providing comfortability and support in a compact package, has surprisingly been discovered.

In one embodiment, a seat may have a seat base substrate comprising a flexible main member. The seat may also have a drive mechanism. The drive mechanism may have a lower slide and an upper slide, wherein the upper slide selectively moves with respect to the fixed lower slide via a rack and pinion system. Other drive mechanisms with or without slides may be used. The seat may also have a pusher releasably attached to the upper slide, wherein the pusher contacts the flexible main member. The seat may also have a trim ring attached to the lower slide.

In another aspect, the trim ring has two arms that may be connected to a seat base frame portion, wherein each arm may have a plurality of trim apertures adapted to receive trim hooks therein, wherein the trim hooks are attached to a seat trim extending over the seat base substrate.

In another aspect, at least one spring housing may be attached to the trim ring, wherein the at least one spring housing may be adapted to hold a portion of a constant force spring therein, wherein the spring housing has spring guides.

In another aspect, a spring may have a first end portion at least partially coiled within the at least one spring housing, another portion adapted to selectively move within the spring guides, and a second end portion connected to the flexible main member.

In another aspect, the pusher may comprise a modular design with at least one button adapted to selectively fit within at least one attachment feature on the upper slide.

In another aspect, the lower slide may comprise a motor housing and a first slot wall extending generally parallel a motor housing wall, wherein a gap exists between the motor housing wall and the first slot wall. The lower slide may also comprise a plurality of slide tabs.

In another aspect, the upper slide may comprise a slide rail adapted to be at least partially received with the slide tabs. The upper slide may also comprise a plurality of attachment features comprising slots on a front of the upper slide. The upper slide may also comprise a second slot wall adapted to selectively move in the gap between the motor housing wall and the first slot wall. The upper slide may also comprise a step in an upper wall of the upper slide, wherein the step is comprised of a plurality of teeth forming a rack of the rack and pinion system.

In another aspect, a pinion gear may be engaged with the plurality of teeth on the rack, and a pinion shaft, attached to the pinion gear, may be located through the lower slide to a motor located in the motor housing of the lower slide.

In another aspect, at least one spring metal strip may be located in a recess on an upper surface of the flexible main member.

In another aspect, the seat base substrate and flexible main member may be unitary, one piece and integrally formed of a flexible material.

In another aspect, at least a portion of a front edge portion of the flexible main member may have a predisposed downward curl with respect a body portion of the flexible main member.

In another aspect, a channel may extend within at least the flexible main member, wherein the channel has at least one retention feature for seat trim integrally formed therewith.

In another aspect, the flexible main member may have a plurality of hook apertures integrally formed therein, wherein at least one connector strip may have at least one hook formed thereon and may be adapted for selective location in one of the hook apertures, wherein seat trim may be connected to a body portion of the connector strip to connect the seat trim with the flexible main member.

In another aspect, the flexible main member may have a first shape comprising a general C-shape and a second shape comprising a general J-shape.

In another aspect, the seat base structure may comprise a suspension of the seat.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
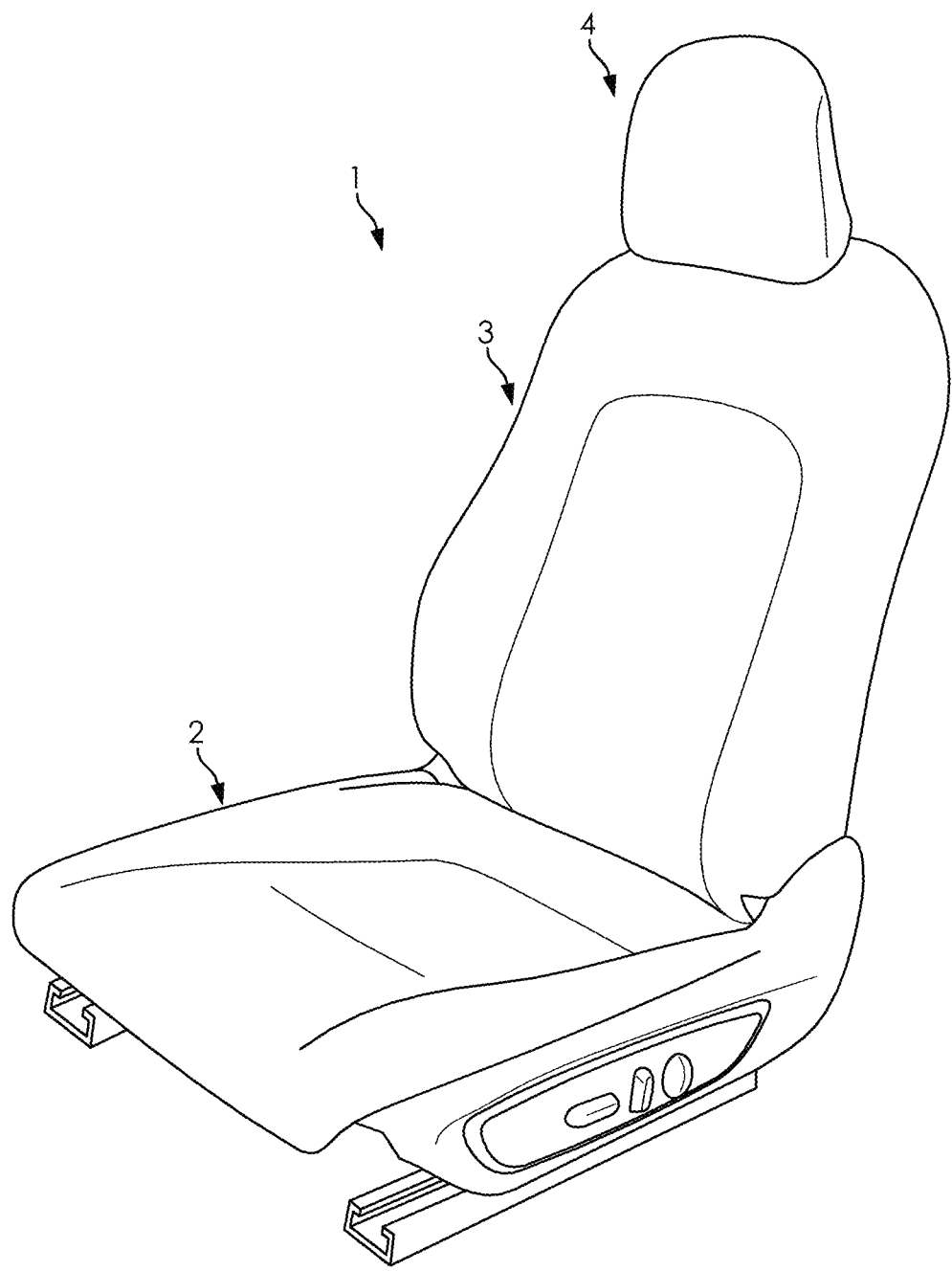
FIG. 1 is a left side front perspective view of a seat system according to an embodiment of the presently described subject matter, the seat system including a seat base assembly, a seat back assembly, and a headrest assembly.
Figure 2:
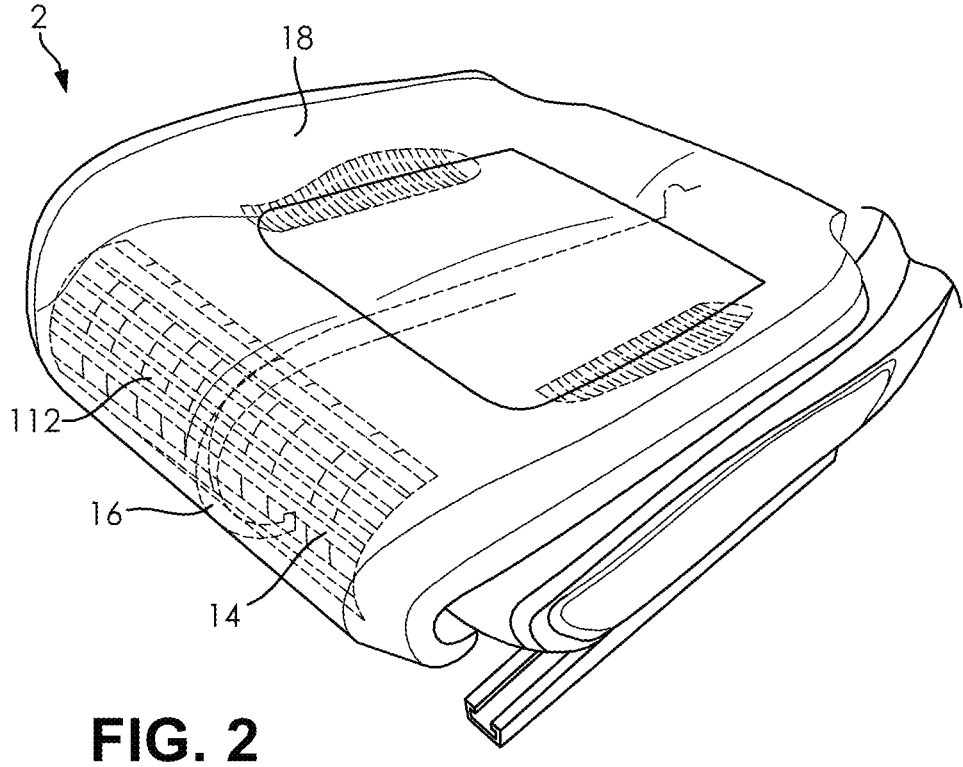
FIG. 2 is a left side front perspective view of a seat base assembly of a seat system according to an embodiment of the presently described subject matter, the seat base assembly including a seat frame, a seat base substrate, an adjustable support, a cushioning member, and a seat cover.

It is to be understood that the presently disclosed subject matter may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

FIG. 1 shows a seat system 1 for a motor vehicle (not depicted) according to an embodiment of the presently described subject matter. The seat system 1 may comprise a seat base assembly 2, a seat back assembly 3, and a headrest assembly 4. The seat back assembly 3 may be coupled to the seat base assembly 2 and the headrest assembly 4. In certain embodiments, the seat base assembly 2 may be movable relative to a floorboard of the vehicle, the seat back assembly 3 may be movable relative to the seat base assembly 2, and the headrest assembly 4 may be movable relative to the seat back assembly 3. The seat base assembly 2 may be configured to support a buttock portion and leg portion of an occupant. The seat back assembly 3 may be configured to support a back region of the occupant.

Figure 8:
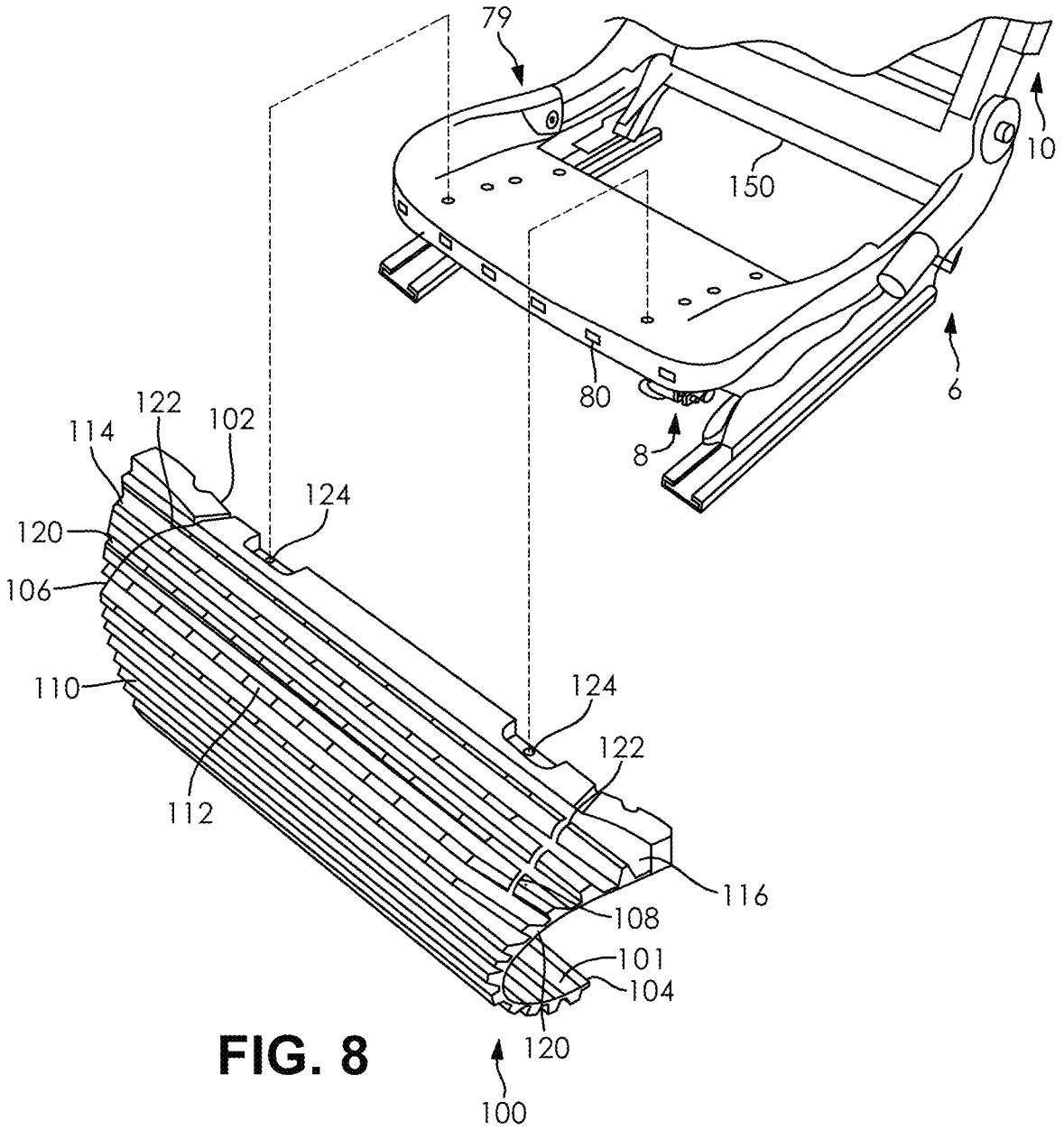
FIG. 8 is a partially exploded view of a portion of a seat system according to another embodiment of the presently described subject matter, wherein a seat base assembly includes a seat base pan portion attached to a seat frame and the seat base pan portion is configured to receive an adjustable support thereon wherein the drive mechanism located under the screw holes in the seat base pan portion are hidden in the view.
Figure 9:
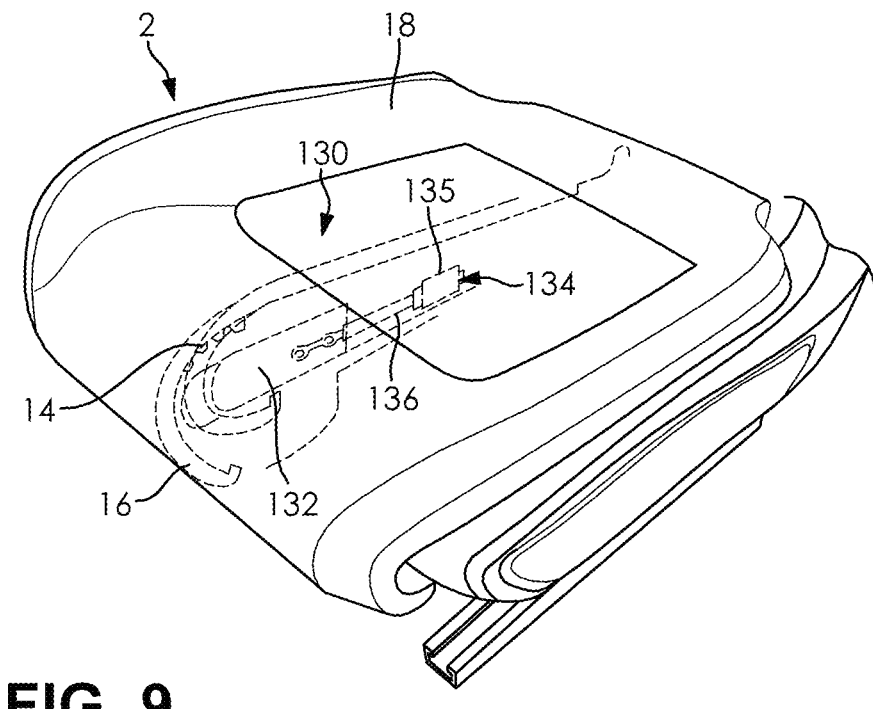
FIG. 9 is a left side perspective view of the seat base assembly of FIG. 2, the seat base assembly including a drive mechanism for the adjustable support according to an embodiment of the presently described subject matter, wherein the seat cover is connected to a component of the seat base assembly located underneath the drive mechanism.
Figure 10:
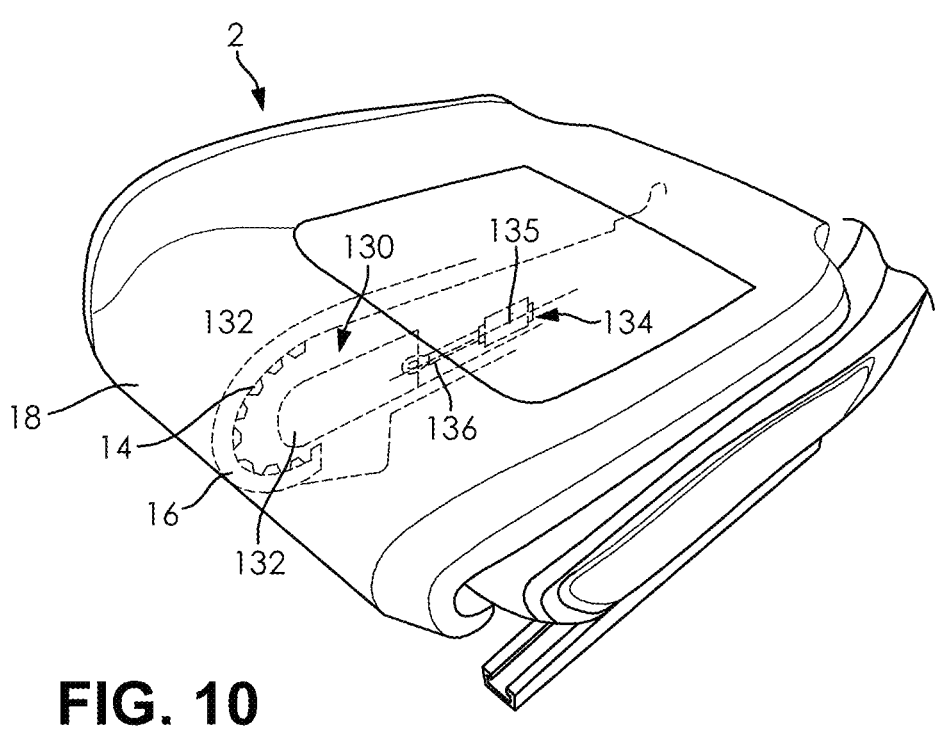
FIG. 10 is a left side perspective view of the seat base assembly of FIG. 9, showing the adjustable support in a retracted position.
Figure 11:
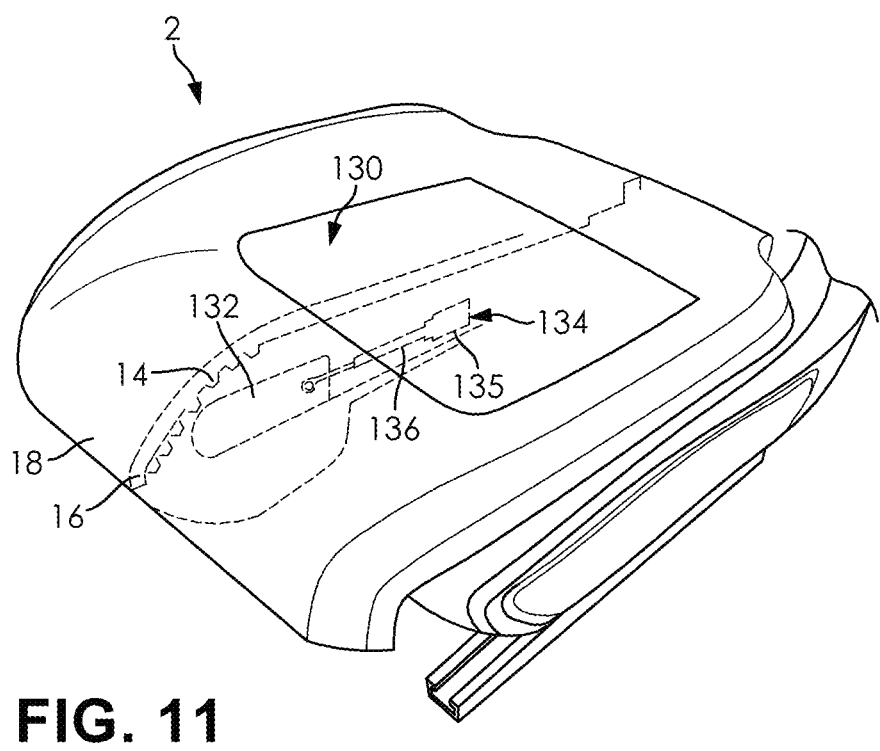
FIG. 11 is a left side perspective view of the seat base assembly of FIG. 9, showing the adjustable support in an extended position.
Figure 12:
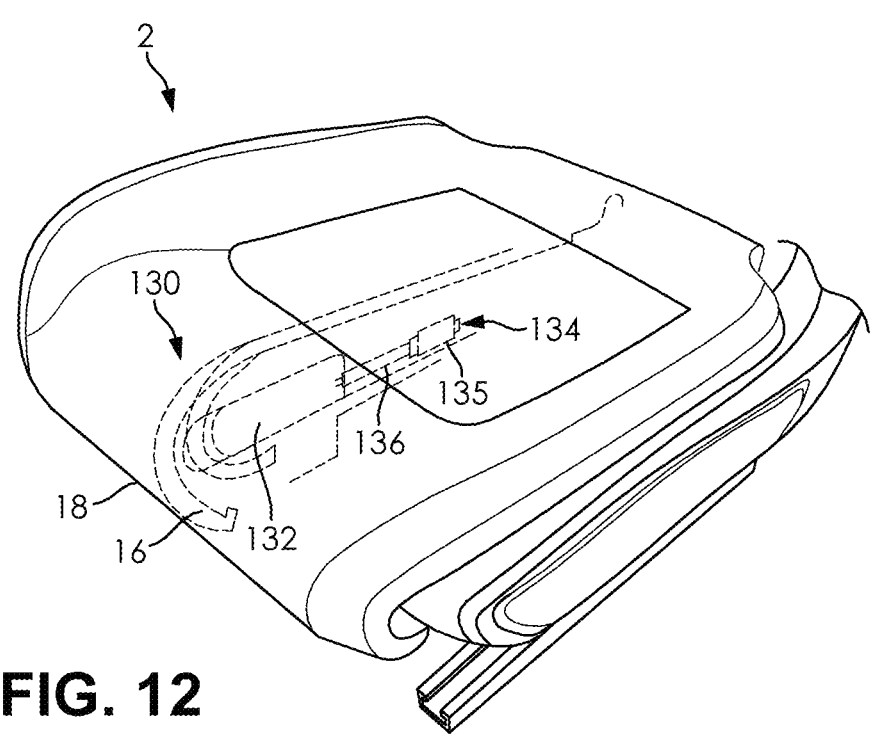
FIG. 12 is a left side perspective view of the seat base assembly of FIG. 2, the seat base assembly including a drive mechanism for the adjustable support according to another embodiment of the presently described subject matter, wherein the seat cover is connected to the flexible main member and the flexible main member is connected to a component of the seat base assembly located underneath the drive mechanism.
Figure 13:
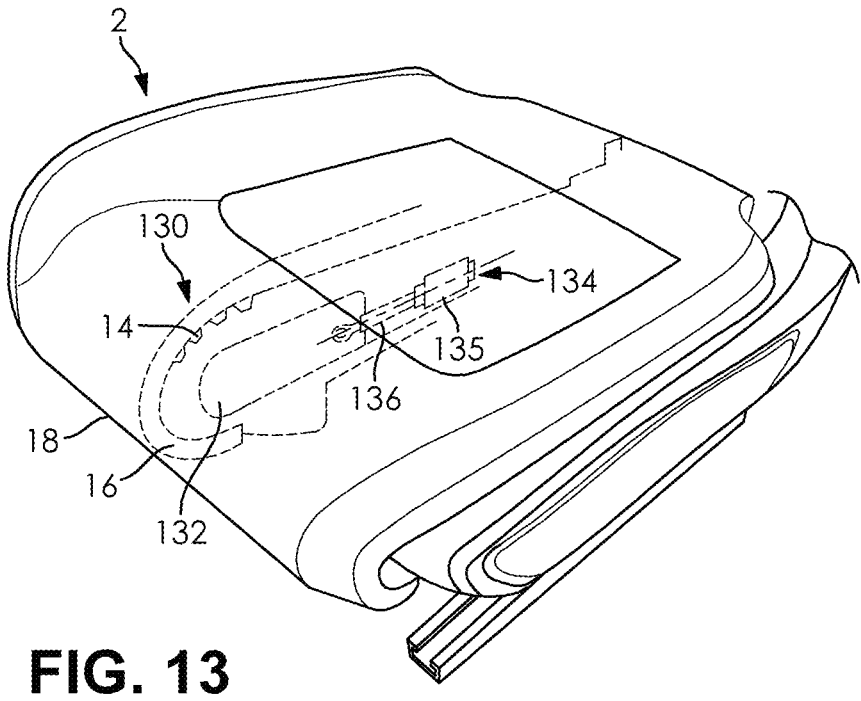
FIG. 13 is a left side perspective view of the seat base assembly of FIG. 12, showing the adjustable support in the retracted position.
Figure 14:
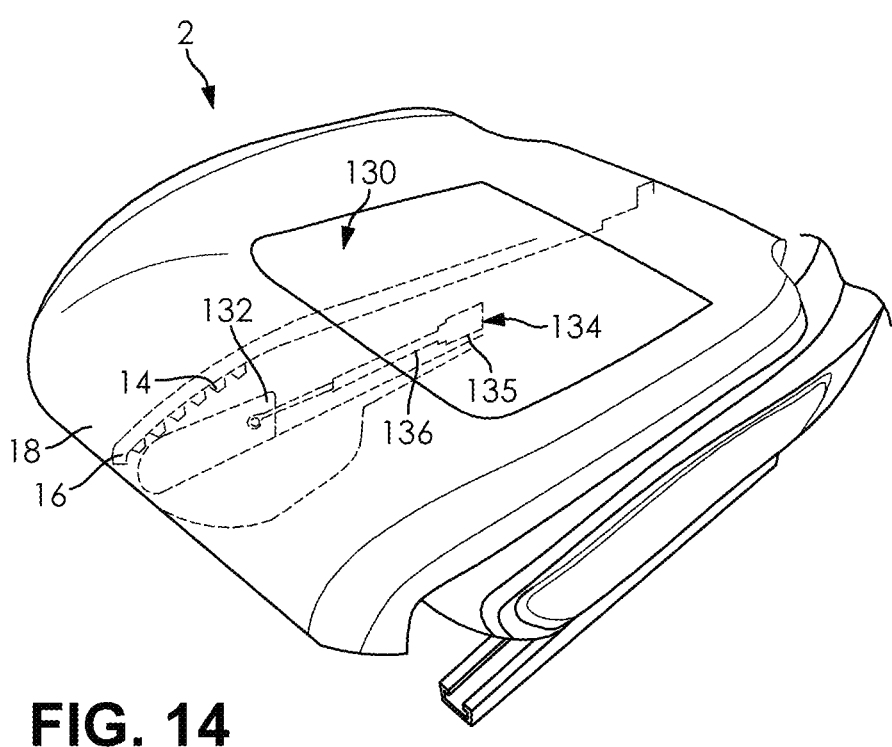
FIG. 14 is a left side perspective view of the seat base assembly of FIG. 12, showing the adjustable support in the extended position.
Figure 15:
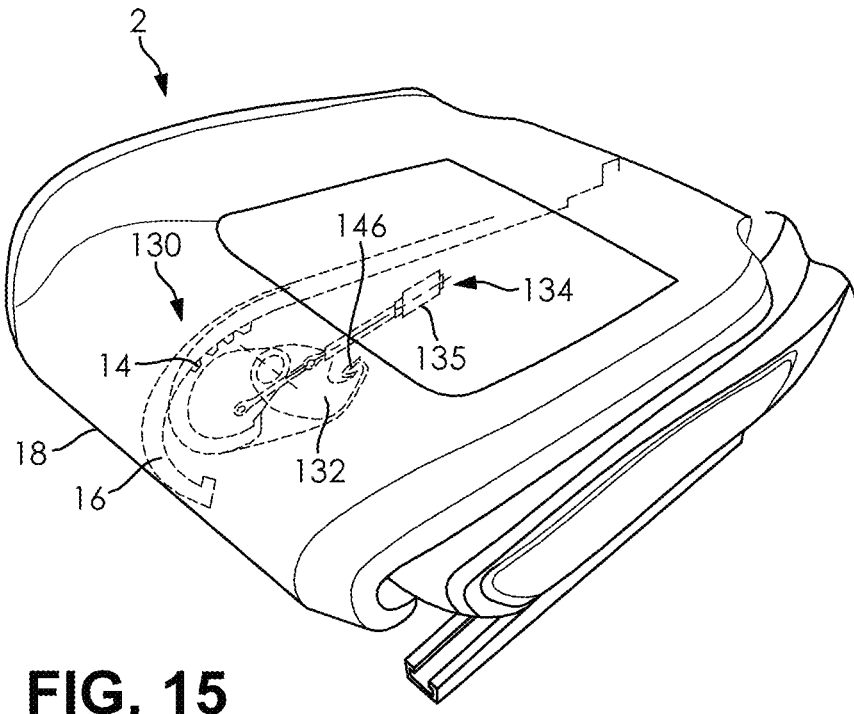
FIG. 15 is a left side perspective view of the seat base assembly of FIG. 2, the seat base assembly including a drive mechanism for the adjustable support according to another embodiment of the presently described subject matter, wherein the seat cover is connected to a movable member of the drive mechanism.
Figure 16:
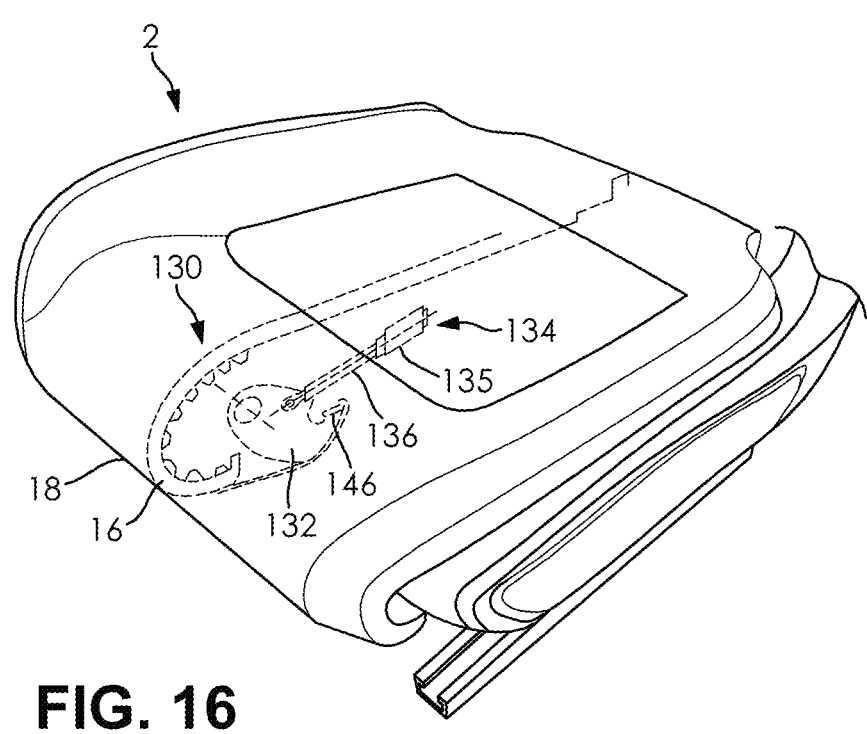
FIG. 16 is a left side perspective view of the seat base assembly of FIG. 15, showing the adjustable support in the retracted position.
Figure 17:
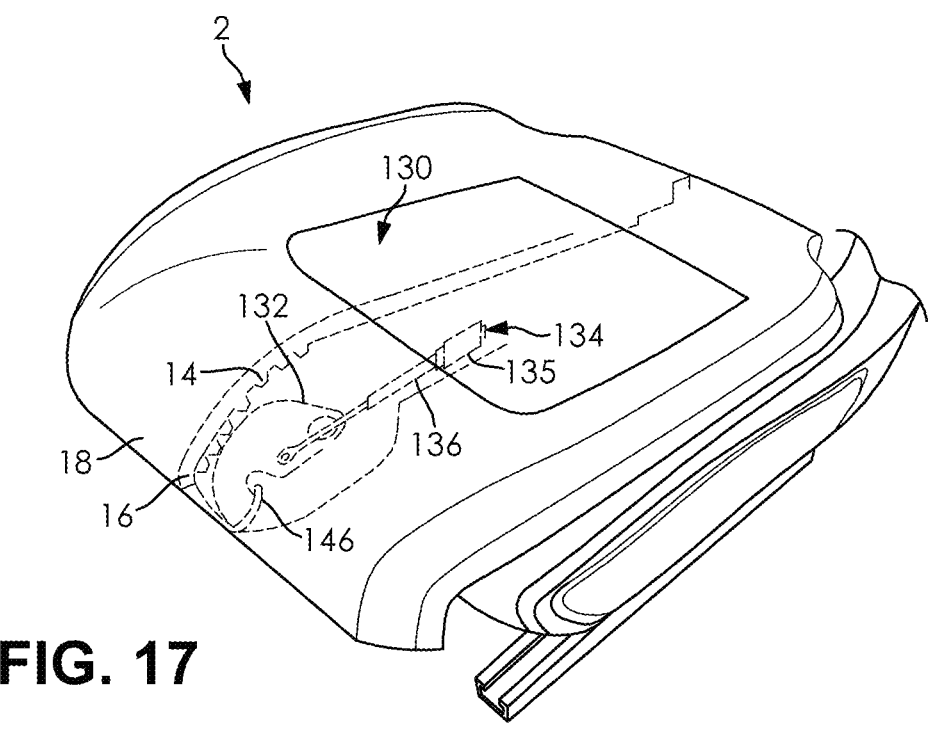
FIG. 17 is a left side perspective view of the seat base assembly of FIG. 15, showing the adjustable support in the extended position.
Figure 18:
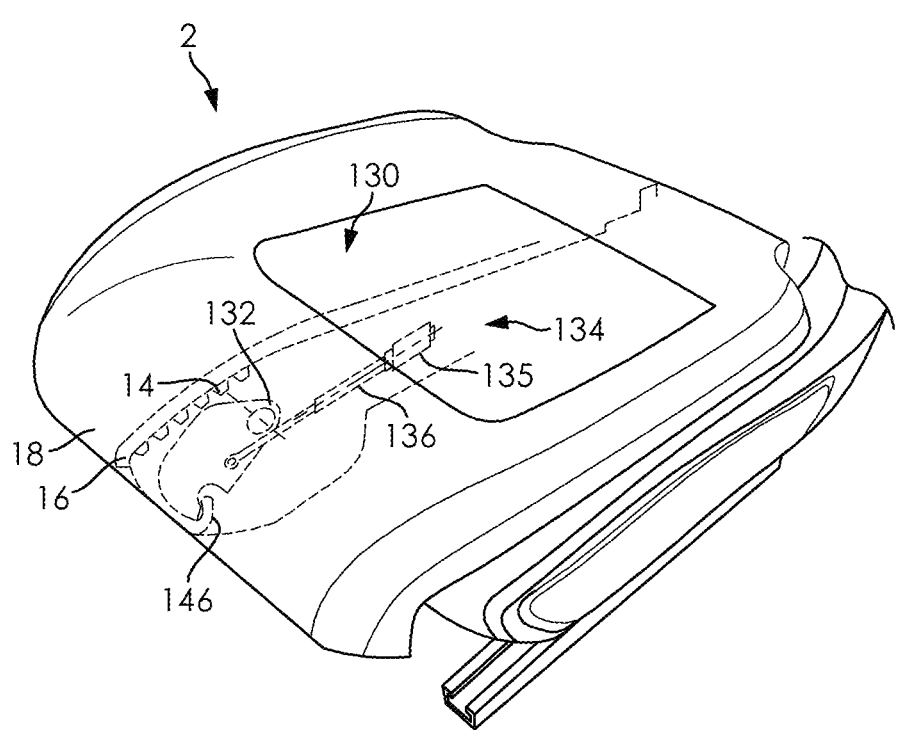
FIG. 18 is a left side perspective view of the seat base assembly of FIG. 15, showing the adjustable support in the extended position.
Figures 19, 20, 21:
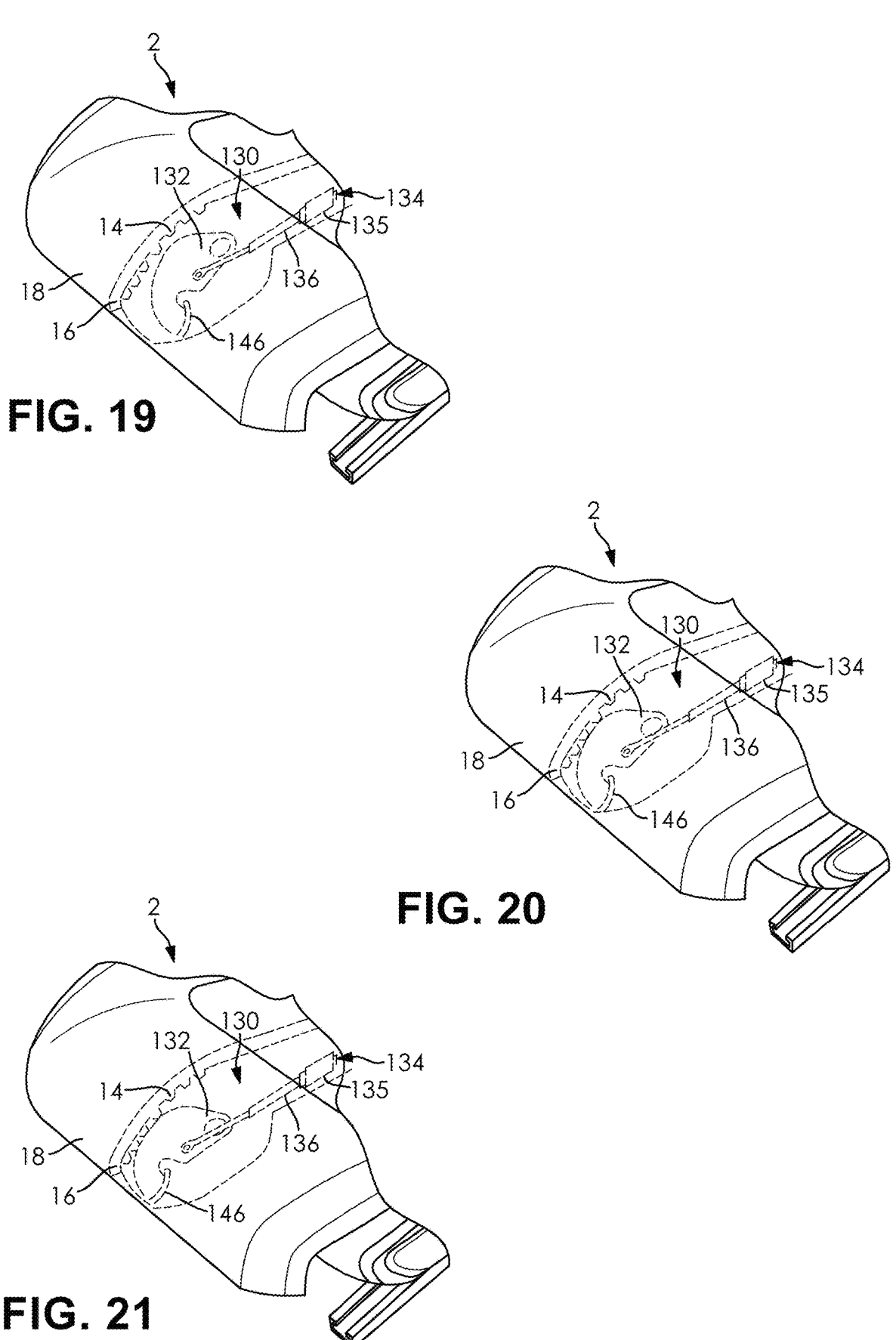
FIG. 19 is an enlarged left side perspective view of a portion of the seat base assembly of FIG. 18, showing the adjustable support in the extended position.
FIG. 20 is an enlarged left side perspective view of a portion of the seat base assembly of FIG. 2, the seat base assembly including a drive mechanism for the adjustable support according to yet another embodiment of the presently described subject matter, wherein the seat cover is connected to a flexible main member of the adjustable support by a bungee drawstring and the flexible main member is connected to a movable member of the drive mechanism.
FIG. 21 is an enlarged left side perspective view of a portion of the seat base assembly of FIG. 2, the seat base assembly including a drive mechanism for the adjustable support according to yet another embodiment of the presently described subject matter, wherein the seat cover is connected to a flexible main member of the adjustable support by a hook connection and the flexible main member is connected to a movable member of the drive mechanism.
Figure 22:
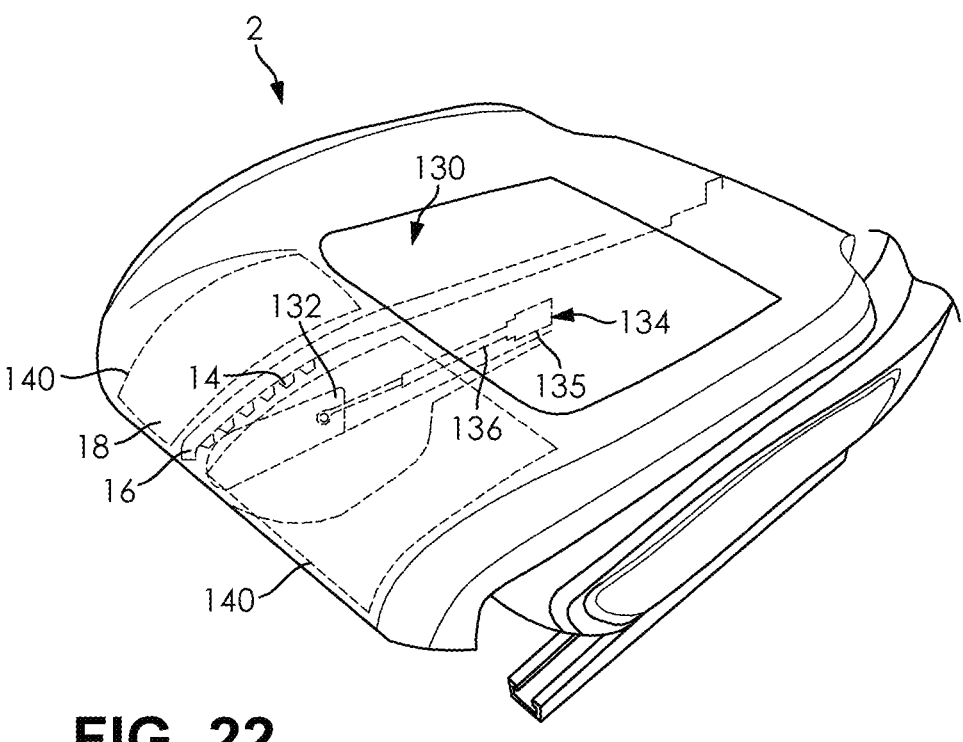
FIG. 22 is a left side front perspective view of the seat base assembly of FIG. 3.
Figure 23:
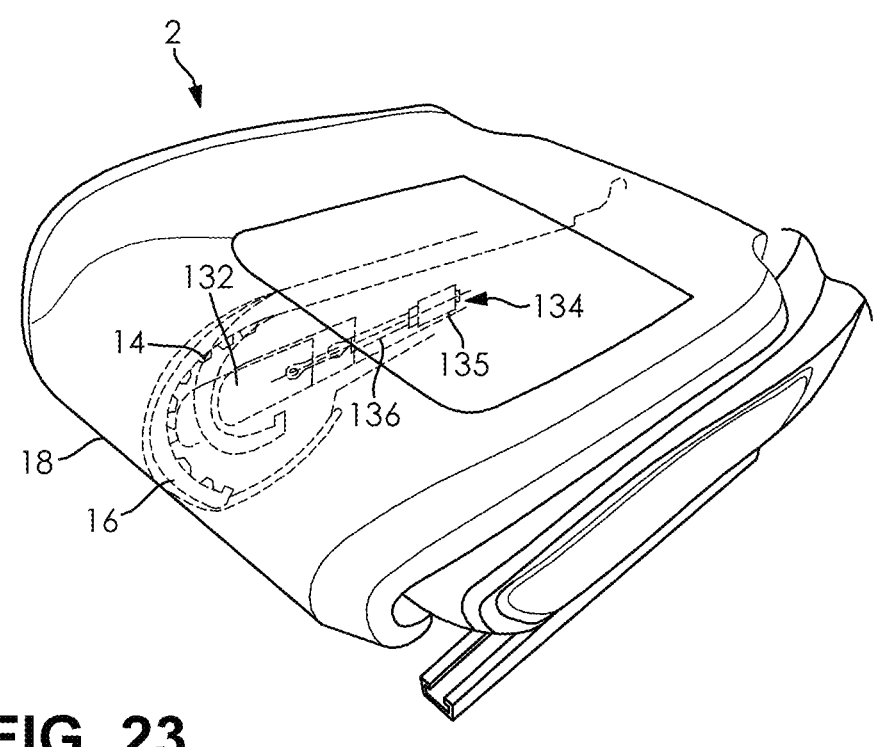
FIG. 23 is a left side perspective view of the seat base assembly of FIG. 9.
Figure 24:
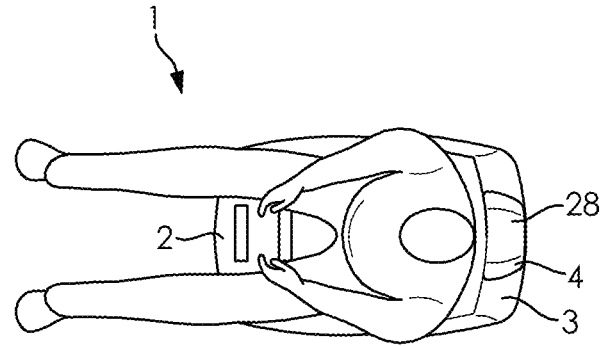
FIG. 24 is a top plan view of a conventional seat system having an occupant disposed therein, wherein the occupant represents a 95$^{th}$ percentile male (U.S.) with legs and knees splayed in a typical seated position.
Figure 25:
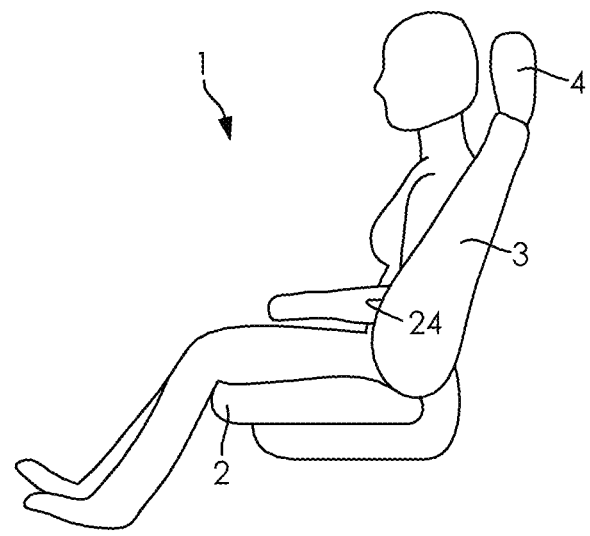
FIG. 25 is a left side elevational view of the conventional seat system having an occupant disposed therein, wherein the occupant represents a 5$^{th}$ percentile female (U.S.) in a typical upright seated position with the seat system fully forward showing an undesirable interference of the prior art thigh support with a back of a calf of the occupant.

As illustrated in FIG. 8, the seat system 1 may also include a seat frame 6 comprising a seat base frame portion 8, a seat back frame portion 10, and a headrest frame portion (not depicted). It is understood that the frame portions may be coupled together using any suitable mean as desired. It is further understood that any suitable material may be employed to produce the frame portions as desired. For example, each of the frame portions may be formed from a rigid metal material.

In certain embodiments, the seat base assembly 2 may include a seat base substrate 14 coupled to the seat base frame portion 8, a cushioning member 16 disposed on the seat base substrate 14, and a seat cover 18 disposed over the cushioning member 16. Similarly, the seat back assembly 4 may include a seat back substrate (not depicted) coupled to the seat back frame portion 10, a cushioning member (not depicted) disposed on the seat back substrate, and a seat cover 24 disposed over the cushioning member. Each of the seat covers 18, 24 may include at least one inner layer disposed on an interior surface thereof. In certain embodiments, the inner layer may be produced from a foam laminate having a thickness in a range of about 3.0 mm to about 10 mm. It is understood that the inner layer may be produced from any suitable material having any suitable thickness, as desired. The headrest assembly 4 may include a cushioning member (not depicted) disposed on the headrest frame portion and a headrest cover 28 disposed over the cushioning member. In one embodiment, each of the cushioning member 16 of the seat base assembly 2 and the cushioning member of the seat back assembly 4 may include at least one void (not depicted) formed therein. The voids may be shaped and sized to receive thermal control members (not depicted) therein. The cushioning members may be produced from any suitable material as desired such as a polymer material, for example. Preferably, each of the cushioning members may be produced from a polyurethane material. In certain embodiments, the thermal control members may be heating and/or cooling pads to provide heat and/or cooling to the occupant of the seat system 1. The thermal control members may be in communication with a controller (not depicted) and a power source (not depicted).

FIGS. 4-7 more clearly show the seat base substrate 14 accordingly to several embodiments of the presently described subject matter. As illustrated, the seat base substrate 14 may be a single, one-piece component. It is understood that the seat base substrate 14 may be a multi-piece component if desired. In certain embodiments, the seat base substrate 14 may be configured having such size and shape to cooperate with a rigid seat base structure such as the seat base frame portion 8, for example. The seat base substrate 14 may be formed of an elastomeric material. More preferably, the seat base substrate 14 may be formed of a thermoplastic elastomer (TPE) material. Various types of the TPE material may be employed such as at least one of a styrenic block copolymer, thermoplastic olefinic elastomer, and/or thermoplastic vulcanisate, for example.

In certain embodiments, the seat base substrate 14 provides conforming support that flexes with the occupant's posture and accommodates differently sized occupants with less need for active adjustments to the seat system 1. In certain embodiments, the seat base substrate 14 may have a flexural modulus in a range of about 200 MPa to about 800 MPa, preferably about 290 MPa, and a tensile modulus in a range of about 10 MPa to about 300 MPa, preferably about 280 MPa. It is understood that the seat base substrate 14 may have any formed from any suitable material having a desired flexural modulus. It is further understood that the seat base substrate 14 may be formed by any suitable method as desired such as an injection molding process, a thermoforming process, a compression molding process, a blow molding process, a vacuum casting process, a three-dimensional printing process, and the like, for example.

The seat base substrate 14 formed from the TPE material may exhibit both thermoplastic and elastomeric properties which permit flexibility of the seat base substrate 14 while militating against a permanent set thereof. As such, the seat base substrate 14 has an ability to stretch to moderate elongations and return to an original shape. Hence, the seat base substrate 14 may be relatively thin as compared to commonly known seat base substrates. In certain embodiments, a thickness of the seat base substrate 14 may be in a range of about 1 mm to about 5 mm, preferably in a range of about 1.5 mm to about 3.0 mm, and more preferably about 2 mm or less. Additionally, the seat base substrate 14 may also permit the cushioning member 16 to also be relatively thin as compared to commonly known cushioning members. In certain embodiments, a thickness of the cushioning member 16 may be in a range of about 15 mm to about 25 mm, preferably 20 mm or less. In other embodiments, the seat base substrate 14 formed from the TPE material may eliminate a need for the cushioning member 16 in the seat base assembly 2. As a non-limiting example, a thickness of the seat base assembly 2 may be about 45 mm less than commonly known seat base assemblies. Accordingly, in certain embodiments, the seat base substrate 14 results in a reduction in mass and size of the seat base assembly 2 as compared to commonly known seat base assemblies. Such reduction in the mass and size of the seat base assembly 2 improves manufacturability and decreases costs, while maintaining comfortability. Furthermore, the seat base assembly 2 minimizes a consumption of valuable space within a passenger compartment of the vehicle. As a result, a size of the passenger compartment of the vehicle, and therefore, a size of the vehicle in its entirety, may be reduced, which also results in a reduction in mass and energy consumption of the vehicle. It should be appreciated that each of the seat base substrate 14, the cushioning member 16, and the seat base assembly 2 may have any thickness as desired.

From the above, it can be appreciated that the seat base substrate 14 may function alone as both a suspension for the seat 1 as well as a structural component of the seat 1. For example, it may be that other springs or biasing members are not required with the seat base 8 to provide a suspension between the seat frame 6. Further, it may be that no other wire structures or structural members are required for the seat base 8 between the seat frame 6.

The seat base substrate 14 includes a front portion 38, a rear portion 39, a first side portion 40 and a second side portion 41. The first side portion 40 may be located on a first side 42 of the seat base substrate 14 and the second side portion 41 may be located on a second side 44 of the seat base substrate 14. Each of the first side portion 40 and the second side portion 41 may include at least one boss 46 and/or attachment features (not depicted) formed therein. At least one of the bosses 46 may include the attachment features and/or openings 47 formed therein. In certain embodiments, at least one of the attachment features may be at least one protuberance (e.g. clip, tab, and the like, etc.) formed on a lower surface of the seat base substrate 14. In other embodiments, the openings 47 may be configured to receive a fastener (not depicted) therein. The openings 47 and the fasteners and/or the attachment features may be configured to facilitate attachment of the seat base substrate 14 to the seat base frame portion 8. A size, shape, and configuration of the bosses 46 and the openings 47 may be any size, shape, and configuration as desired. More or less bosses 46, openings 47 and attachment features than shown may be employed to facilitate attachment of the seat base substrate 14 to the seat base frame portion 8.

Each of the front portion 38 and the rear portion 39 of the seat base substrate 14 may further include at least one boss 45, 49, respectively, formed therein. At least one of bosses 45, 49 may include an opening 51 configured to receive a fastener (not depicted) employed to attach the seat base substrate 14 to the seat base frame portion 8. In certain embodiments, the seat base substrate 14 may further include a laterally extending flange configured to cooperate with the seat base frame portion 8. More preferably, the flange has a generally C-shaped cross-section adapted to wrap around a portion of a tubular cross member 150 of the seat base frame portion 8. It should be appreciated, however, that the flange cooperates with the tubular cross member 150 in such a manner as to permit the seat base substrate 14 to move fore and aft, up and down and/or pivotal movement with respect to the seat base frame portion 8.

The seat base substrate 14 further includes a main support portion 50 formed between the front and rear portions 38, 39 and between the first and second side portions 40, 41. The main support portion 50 may be provided in a central section of the seat base substrate 14. The front portion 38 and the main support portion 50 may be disposed at an angle with respect to a horizontal axis of the seat base assembly 2. In certain embodiments, the angle may be in a range from about 5° to about 30°, preferably about 15°. The first side portion 40 and the second side portion 41 may be arranged at an angle greater than zero relative to the main support portion 50. The main support portion 50 may be connected to the first side portion 40 by a plurality of connecting portions 52 and to the second side portion 41 by a plurality of connecting portions 54. A flexibility of the connecting portions 52, 54 permit the main support portion 50 to move relative to the first side portion 40 and the second side portion 41 when a load is applied to the seat base substrate 14 by the occupant. In certain embodiments, the main support portion 50 may deflect more quickly than the first side portion 40 and the second side portion 41 when the load is applied to the seat base substrate 14 by the occupant. The front and rear portions 38, 39 and the first and second side portions 40, 41 may deflect at a different rate than a rate of deflection of the main support portion 50 when the load is applied to the seat base substrate 14 by the occupant.

As shown, the main support portion 50 may include openings 56, openings 57, openings 58, openings 59, openings 60, openings 62, openings 64, openings 66, and openings 68 formed therein. Each of the openings 56 may be located opposite at least one of the openings 57 of the first side portion 40. The openings 56 may or may not be in communication with the openings 57. Each of the openings 58 may be located opposite at least one of the openings 59 of the second side portion 41. The openings 58 may or may not be in communication with the openings 59. At least one of the openings 56, 57, 58, 59, 60, 62, 64, 66, 68 may be formed in the seat base substrate 14 to reduce mass thereof and permit the main support portion 50 to move relative to the first and second side portions 40, 41 when the load is applied to the seat base substrate 14 by the occupant. It is understood that the seat base substrate 14 may include more or less openings 56, 57, 58, 59, 60, 62, 64, 66, 68 formed therein if desired. In certain embodiments, the more openings 56, 57, 58, 59, 60, 62, 64, 66, 68 formed in the seat base substrate 14 may permit the main support portion 50 to deflect more quickly when the load is applied to the seat base substrate 14 by the occupant. In other embodiments, the openings 56, 57, 58, 59, 60, 62, 64, 66, 68 may be formed in the seat base substrate 14 with particular sizes and shapes and in certain locations and configurations to achieve a desired deflection of the main support portion 50 when the load is applied to the seat base substrate 14 by the occupant, and therefore, a desired comfort level when the seat system 1 is in use by the occupant.

As best seen in FIGS. 4-7, the seat base substrate 14 may include a plurality of retention features 69. Each of the retention features 69 may be configured to receive at least a portion of the seat cover 18. In certain embodiments, the seat base substrate 14 includes a pair of opposing retention features 69. As shown, the retention features 69 may be arranged along a perimeter of the main support portion 50 and/or corresponding to a perimeter of the void formed in the cushioning member 16. Such arrangement of the retention features 69 permits the seat cover 18 to be directly secured to the seat base substrate 14 and also secure the cushioning member 16 to the seat base substrate 14. As illustrated, one of the retention features 69 may be located between the openings 56 and the openings 57 extending longitudinally between the openings 60 of the first side portion 40 and another one of the retention features 69 may be located between the openings 58 and the openings 59 extending longitudinally between the openings 62 of the second side portion 41.

Figure 7:
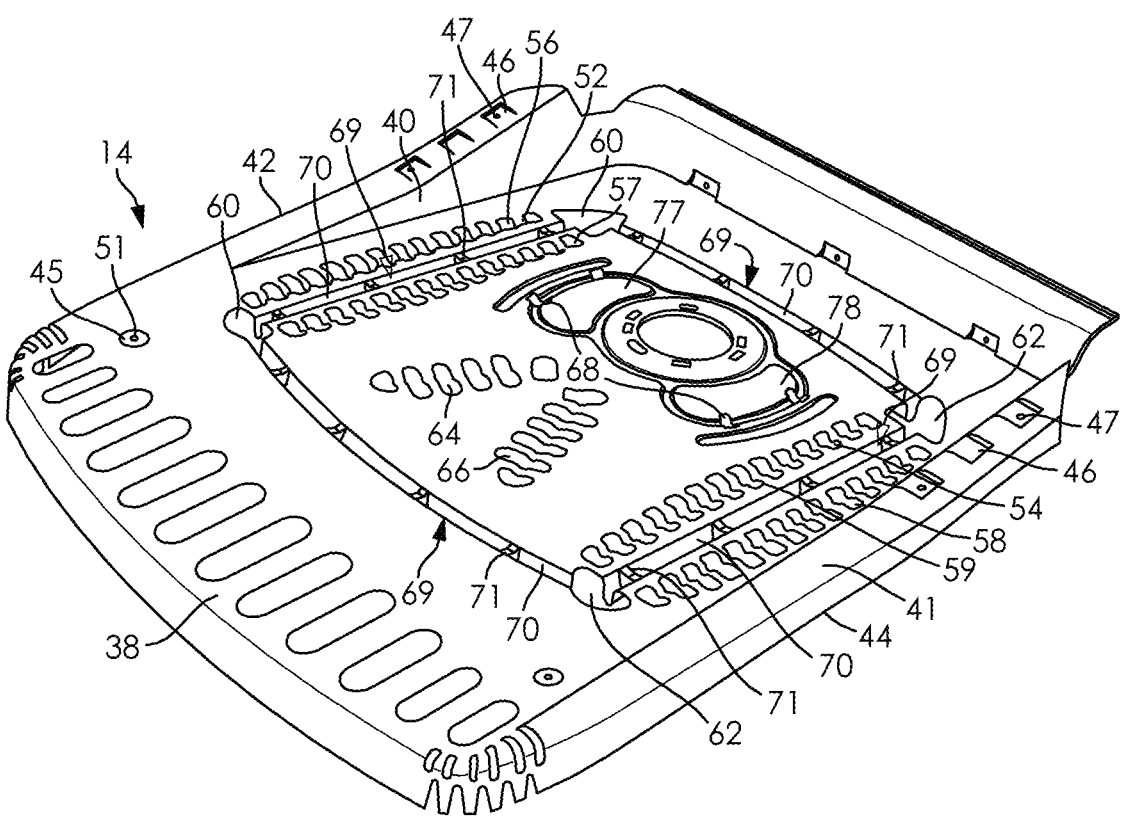
FIG. 7 is a left side perspective view of a seat base substrate according to another embodiment of the presently described subject matter.

In certain embodiments, each of the retention features 69 may comprise an elongate channel 70 formed in the seat base substrate 14 having at least one retaining element 71, as shown in FIG. 7. The retaining element 71 may be configured to secure the portion of the seat cover 18 in the channel 70 on the seat base substrate 14. The retention feature 69 may include at least one pair of opposing retaining elements 71 extending downwardly into the channel 70. Various types of retaining elements 71 may be employed as desired such as tabs, protuberances, flanges, and the like, for example. In certain embodiments, the seat cover 18 may include a plurality of attachment members (not depicted). Each of the attachment members may be configured to be received in the retention features 69 of the seat base substrate 14 and secured by the retaining elements 71 thereof. Each of the attachment members may include an enlarged end or edge portion (e.g. a bulbous portion or arrowhead-shaped portion) having a diameter greater than an opening formed between the pairs of opposing retaining elements 71 of the retention feature 69. In certain embodiments, the attachment members of the seat cover 18 comprise a retaining member having the enlarged edge portion coupled to the seat cover 18. As a non-limiting example, the attachment members may be sewn to the seat cover 18.

As more clearly shown in FIGS. 4-7, the seat base substrate 14 may further include at least one rib 76 formed therein to provide support in desired areas of the seat base substrate 14. In certain embodiments, a plurality of ribs 76 may be formed in a rear area of the main support portion 50 of the seat base substrate 14. As shown, the ribs 76 may be arranged to form a pair of support regions 77, 78 on opposing sides of the main support portion 50. It should be appreciated that the ribs 76 may have any shape, size, and configuration as desired. It is also understood that more or less ribs 76 may be formed in the seat base substrate 14 as desired.

In other embodiments shown in FIG. 8, the seat base assembly 2 may employ a seat base pan portion 79 instead of, or in addition to, the seat base substrate 14. It should be appreciated that the seat base pan portion 79 may be integrally formed with the seat base frame portion 8 or may be formed as a separate and distinct component of the seat base assembly 2. Various materials may be employed to produce the seat base pan portion 79 such as a metal material, a plastic material, a combination thereof, and the like, for example. At least one opening 80 may be formed in the seat base pan portion 79 to permit attachment of the seat cover 18 thereto. It is understood that other suitable attachment methods may be employed to affix the seat cover 18 to the seat base pan portion 79.

As best seen in FIGS. 4-6 and 8, the seat base assembly 2 may further include an adjustable support 100. The adjustable support 100 may be configured to enhance comfort and enable support for the various driving positions and body size of the occupant. Additionally, the adjustable support 100 provides simplified execution combined with improved functionality and usability over the prior art. As a non-limiting example, the adjustable support 100 may be configured to be extended behind knees of an occupant having a larger body size with legs naturally splayed. As another non-limiting example, the adjustable support 100 may be configured to be retracted behind knees of an occupant having a smaller body size so as not to interfere with the back of the calves of the occupant. In certain embodiments, the adjustable support 100 may laterally extend across a portion, an entirety, or even outside an outer edge of a front portion of the seat base assembly 2 to provide a desired comfort and/or accommodate leg splay of the occupant.

At least a portion of the adjustable support 100 may be formed from various materials such as a metal material, a plastic material, a combination thereof, and the like, for example, and more preferably, a TPE material. The TPE material may exhibit both thermoplastic and elastomeric properties which permit flexibility of the adjustable support 100 while militating against a permanent set thereof. As such, the adjustable support 100 has an ability to stretch to moderate elongations and return to an original shape. Hence, the adjustable support 100 may be relatively thin as compared to commonly known thigh supports. In certain embodiments, a thickness of the adjustable support 100 may be in a range of about 1 mm to about 5 mm, preferably in a range of about 1.5 mm to about 3.0 mm, and more preferably about 2 mm or less. It is understood that the adjustable support 100 may have any suitable thickness as desired. Additionally, the adjustable support 100 may also permit the cushioning member 16 to also be relatively thin as compared to commonly known cushioning members. In certain embodiments, a thickness of the cushioning member 16 may be in a range of about 15 mm to about 25 mm, preferably 20 mm or less. It is understood that the cushioning member 16 may have any suitable thickness as desired. In other embodiments, the adjustable support 100 formed from the TPE material may eliminate a need for the cushioning member 16 in the seat base assembly 2. Accordingly, in certain embodiments, the adjustable support 100 results in a reduction in mass and size of the seat base assembly 2 as compared to commonly known seat base assemblies. Such reduction in the mass and size of the seat base assembly 2 improves manufacturability and decreases costs, while maintaining comfortability. Furthermore, the adjustable support 100 minimizes a consumption of valuable space within the passenger compartment of the vehicle. As a result, the size of the passenger compartment of the vehicle, and therefore, the size of the vehicle in its entirety, may be reduced, which also results in a reduction in mass and energy consumption of the vehicle.

The adjustable support 100 shown in FIGS. 4-6 and 8 may be a flexible main member 101 having an upper portion 102, a lower portion 104, a first side 106, and an opposing second side 108. A plurality of ribs 110 may be formed on an outer surface of the flexible main member 101 extending laterally from the first side 106 to the second side 108. It is understood that more or less ribs 110 and/or shorter or longer ribs 110 may be employed as desired. It is further understood that each of the ribs 110, or even a portion of the ribs 110, may have any shape, size, and configuration as desired. In certain embodiments, the ribs 110 may be configured to control at least one of a bending, shape, and form of the adjustable support 100. As a non-limiting example, the ribs 110 may be spaced apart at equal intervals. As another non-limiting example, the ribs 110 may be spaced apart at variable intervals. It should be appreciated, however, that the ribs 110 may be spaced further apart or in closer proximity to one another depending on the desired characteristics of the adjustable support 100. Although the ribs 110 shown are formed to extend laterally and continuously along a width of the flexible main member 101, it is understood that the ribs 110 may include at least one interruption formed therein.

As shown, the flexible main member 101 of the adjustable support 100 may further include a plurality of openings 112 formed therein. The openings 112 may enhance the flexibility of the flexible main member 101 and/or increase an airflow through and around the adjustable support 100 for the comfort of the occupant.

Figure 4:
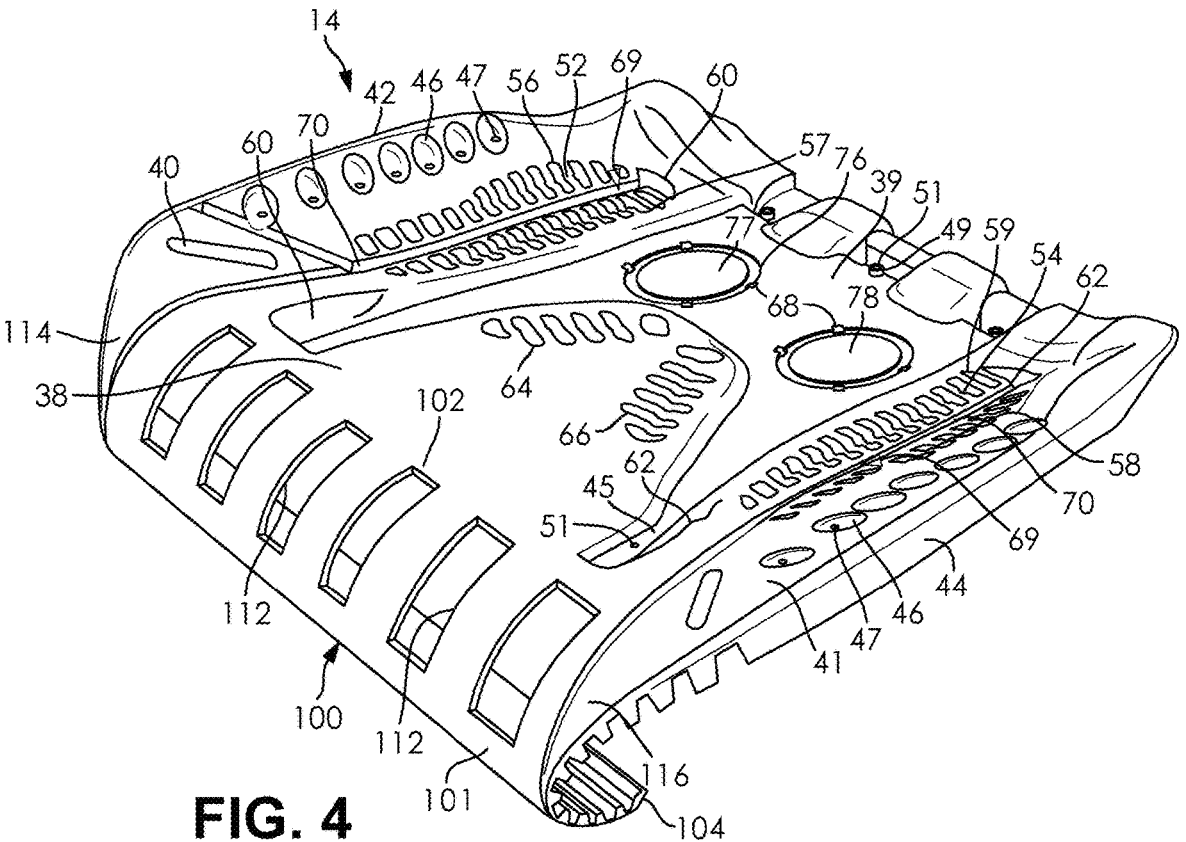
FIG. 4 is a left side perspective view of a seat base substrate having an adjustable support integrally formed therewith according to an embodiment of the presently described subject matter.
Figure 5:
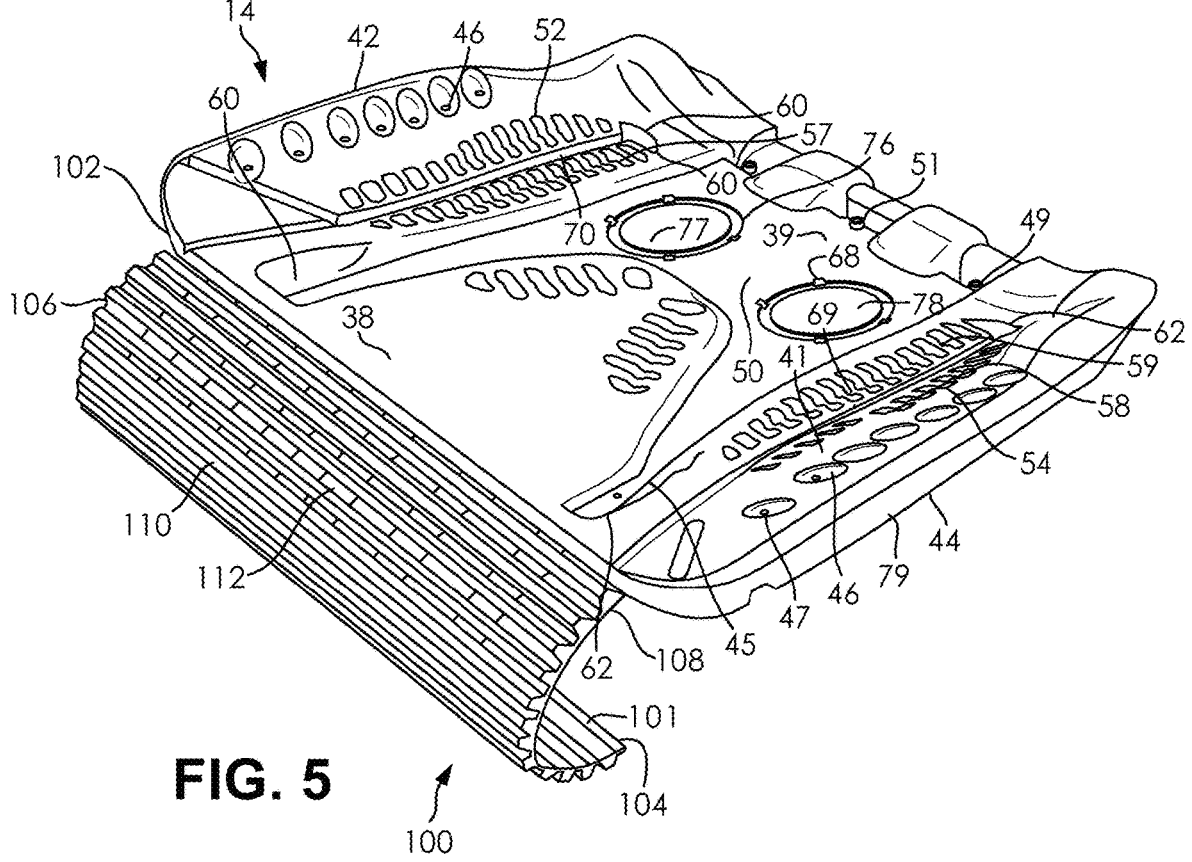
FIG. 5 is a left side perspective view of the seat base substrate of FIG. 2, the seat base substrate having an adjustable support integrally formed therewith according to another embodiment of the presently described subject matter.
Figure 6:
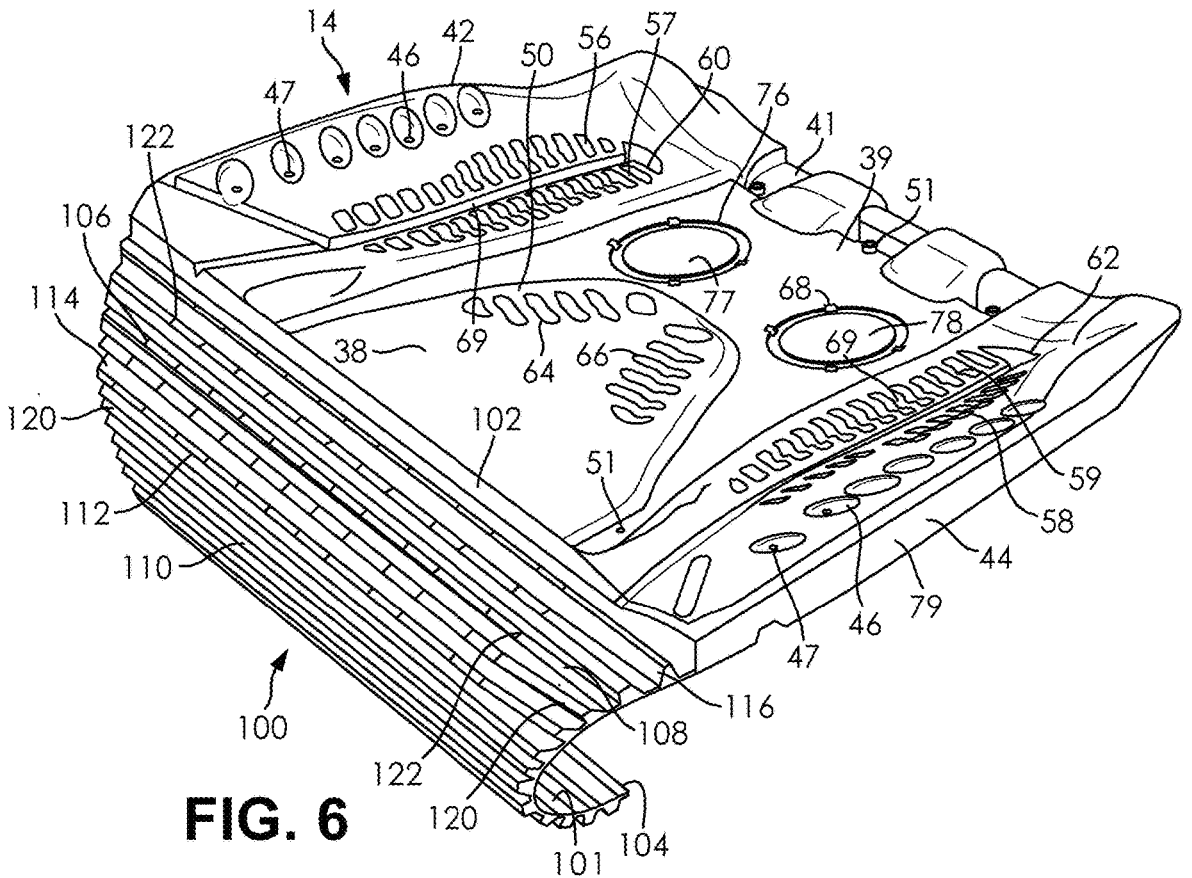
FIG. 6 is a left side perspective view of the seat base substrate of FIG. 2, the seat base substrate having an adjustable support integrally formed therewith according to another embodiment of the presently described subject matter, wherein a flexible main member of the adjustable support includes opposing side members.

The upper portion 102 of the flexible main member 101 may be coupled to the main support portion 50 of the seat base substrate 14, shown in FIGS. 4-6, or the seat base pan portion 79, shown in FIG. 8. In the embodiment shown in FIG. 5, the upper portion 102 extends along an entire front peripheral edge of the main support portion 50 and is separated from the side bolsters 42, 44. In other embodiments, the adjustable support 100 may further include a flexible first side member 114 and a flexible second side member 116. The side members 114, 116 may maximize a width of the adjustable support 100 that supports the legs of the occupant, which in turn enhances the desired comfort of the occupant. As illustrated in FIGS. 6, the first side member 114 may be coupled to the first side 106 of the flexible main member 101 and an upper portion thereof may be coupled to a front peripheral edge of the first side bolster 42. Similarly, the second side member 116 may be coupled to the second side 108 of the flexible main member 101 and an upper portion thereof may be coupled to a front peripheral edge of the second side bolster 44. In the embodiment shown in FIG. 8, at least one of the first side member 114, the second side member 116, and an upper portion of the flexible main member 101 may be coupled to a front portion of the seat base pan portion 79.

A plurality of ribs 120 may be formed on an outer surface of each of the side members 114, 116 extending laterally across a width thereof. It is understood that more or less ribs 120 and/or shorter or longer ribs 120 may be employed as desired. It is further understood that each of the ribs 120, or even a portion of the ribs 120, may have any shape, size, and configuration as desired. In certain embodiments, the ribs 120 may be configured to control at least one of a bending, shape, and form of the adjustable support 100. As a non-limiting example, the ribs 120 may be spaced apart at equal intervals. As another non-limiting example, the ribs 120 may be spaced apart at variable intervals. It should be appreciated, however, that the ribs 120 may be spaced further apart or in closer proximity to one another depending on the desired characteristics of the adjustable support 100. Although the ribs 120 shown are formed to extend laterally and continuous along the width of the side members 114, 116, it is understood that the ribs 120 may include at least one interruption formed therein.

As shown, each of the side members 114, 116 of the adjustable support 100 may further include a plurality of openings (not depicted) formed therein. The openings may enhance the flexibility of the side members 114, 116 and/or increase an airflow through and around the adjustable support 100 for the comfort of the occupant.

Each of the side members 114, 116 may further include at least one attachment feature 122 formed therein to produce a fully-trimmed construction of the adjustable support 100. The attachment feature 122 may be configured to permit attachment of the seat cover 18 thereto. It is understood that other suitable attachment methods may be employed to affix the seat cover 18 to the adjustable support 100. This versatility and simplification of the fully-trimmed construction of the adjustable support 100 enables a variety of different seat trim designs without a need of an independent movement and noticeable separation between the adjustable support 100 and the seat base assembly 2.

As illustrated in the embodiments shown in FIGS. 4-6, the flexible main member 101 and/or the side members 114, 116 of the adjustable support 100 may be integrally formed with the seat base substrate 14, thereby forming a unitary, single piece component. In other embodiments, the flexible main member 101 and/or the side members 114, 116 of the adjustable support 100 may be integrally formed together, but formed separate and distinct from the seat base frame portion 8, the seat base substrate 14, and/or the seat base pan portion 79 thereby forming a multi-piece component. In a non-limiting example shown in FIG. 8, the flexible main member 101 and/or the side members 114, 116 of the adjustable support 100 may be coupled to the seat base pan portion 79 by at least one mechanical fastener 124. Various other methods of engagement and affixation may be employed to couple the flexible main member 101 and/or the side members 114, 116 of the adjustable support 100 to at least one of the seat base frame portion 8, the seat base substrate 14, and the seat base pan portion 79, as desired.

In certain embodiments, the flexible main member 101 and/or the side members 114, 116 of the adjustable support 100 may have a generally arcuate cross-sectional shape. It should be appreciated, however, that the adjustable support 100 may have any shape, size, and configuration as desired. As illustrated, the lower portion 104 of the flexible main member 101 may curl around the front portion of the seat base assembly 2 to an underside of the seat base substrate 14.

In certain embodiments, the adjustable support 100 is selectively positionable between a retracted first position, shown in FIGS. 1, 6, 7, 9, 10, 12, 13, 20, 23, and 24, and an extended second position, shown in FIGS. 2, 6, 8, 9, 11, 12, 14, 15-18, 19, and 20. An drive mechanism 130 may be employed to cause the adjustable support 100 to be selectively positioned between the first position and the second position. As such, the adjustable support 100 may be positioned in an infinite amount of positions between the first position and the second position. It is understood that the drive mechanism 130 may be manual, automatic, or semiautomatic. The drive mechanism 130 may be in electrical communication with a controller (not depicted) and a power source (not depicted). As illustrated, the drive mechanism 130 is disposed between an underside of the base seat structure 14 and/or the adjustable support 100 and the floorboard of the vehicle. It is understood that the drive mechanism 130 may be located elsewhere within the seat base assembly 2 as desired.

Figure 26:
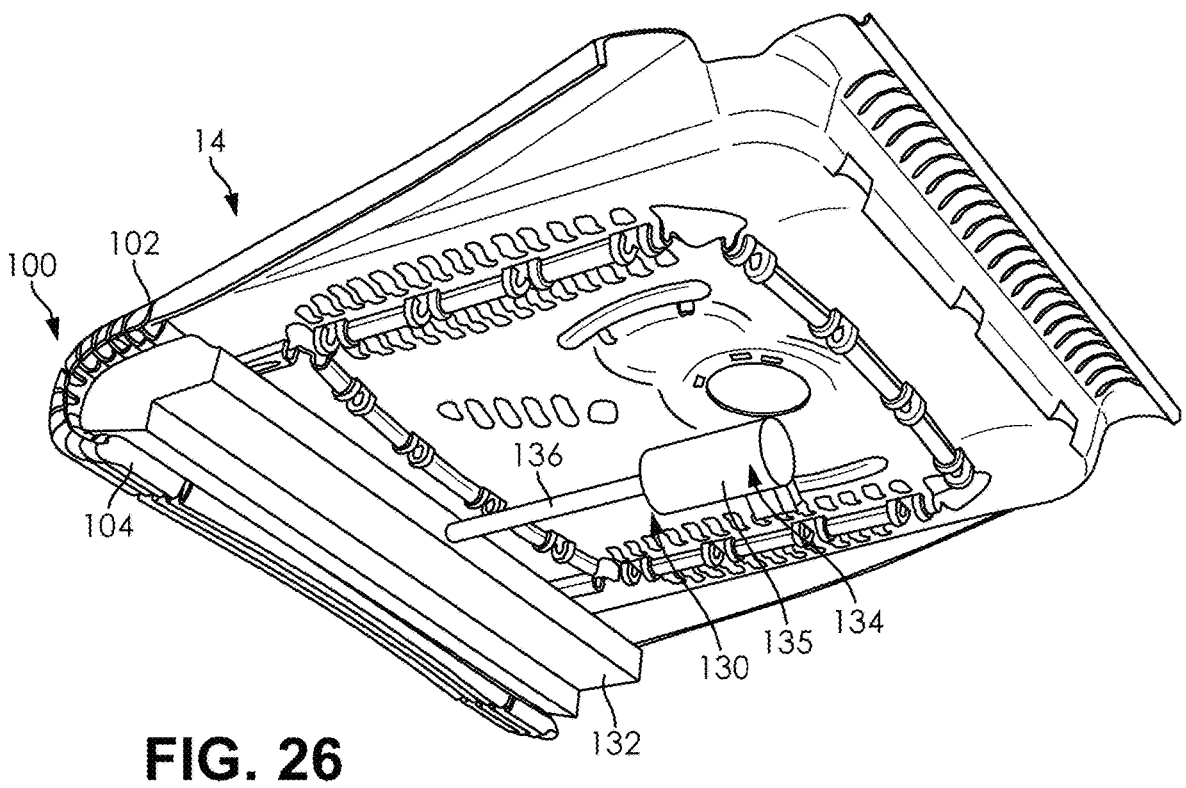
FIG. 26 is a bottom perspective view of the seat base assembly of FIG. 2, showing a drive mechanism according to an embodiment of the presently described subject matter.

As illustrated, the drive mechanism 130 may include a movable member 132 drivingly connected to an actuator 134. The actuator 134 may be in electrical communication with the controller and the power source. In certain embodiments, the actuator 134 may include a motor 135 in communication with the controller and the power source and drivingly connected to a control arm 136 configured to selectively traverse in a linear direction. It is understood, however, that the drive mechanism 130 may include any type of movable member 132 and/or actuator 134 as desired. It is also understood that the movable member 132 may extend laterally along a portion or an entirety of the underside of the seat base assembly 2 and/or the adjustable support 100, as shown in FIG. 26.

In embodiments depicted in FIGS. 3, 9-14, 22, and 23, the movable member 132 may be a linear slide member connected to the actuator 134 and configured to selectively and linearly move in a fore direction and an aft direction. In other embodiments depicted in FIGS. 15-21, the movable member 132 may be a rotatable and/or pivotable cam member connected to the actuator 134 and configured to selectively rotate and/or pivot in the fore direction and the aft direction. When the movable member 132 moves in the fore direction the adjustable support 100 is caused to selectively move and uncurl from the retracted position to the extended position. When the movable member 132 moves in the aft direction the adjustable support 100 is caused to selectively move and curl back from the extended position to the retracted position. It should be appreciated that the movable member 132 may be other various types of mechanisms configured to cause the adjustable support 100 to selectively move between the retracted and extended positions.

Figure 3:
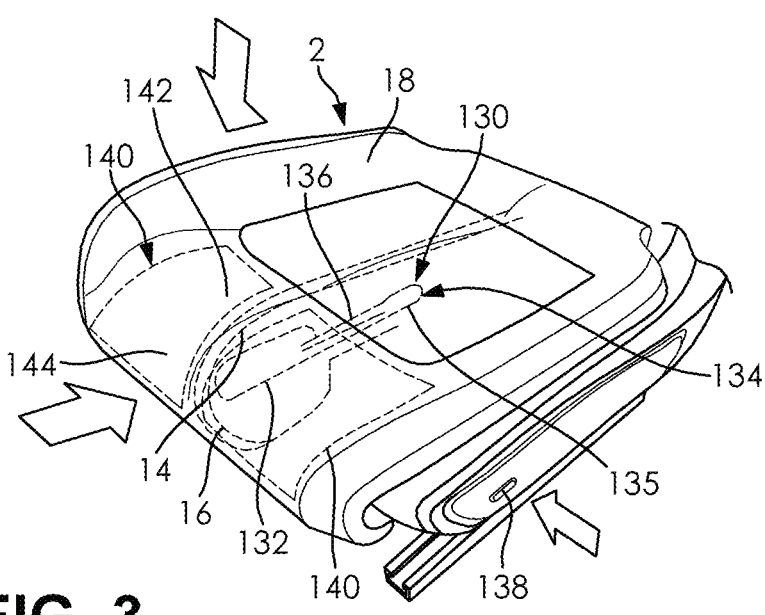
FIG. 3 is a left side front perspective view of the seat base assembly of FIG. 2, wherein the seat base assembly further includes a sensing system having a first pressure sensitive surface and a second pressure sensitive surface.

As more clearly depicted in FIG. 3, an actuation of the drive mechanism 130 may be achieved manually via an occupant input device 138 and/or automatically or semiautomatically via a sensing system 140 of the seat base assembly 2. It is understood that at least one of the occupant input device 138 and the sensing system 140 may be in electrical communication with the controller. The controller may be configured to receive a signal from at least one of the occupant input device 138 and the sensing system 140. Additionally, the controller may be configured to generate and transmit a control signal to the actuator 134 of the drive mechanism based upon the signal received from at least one of the occupant input device 138 and the sensing system 140. The actuator 134 may be configured to selectively position the adjustable support 100 based upon the control signal received from the controller.

In certain embodiments, the sensing system 140 may be a pressure sensing system including at least one pressure sensitive surface. As illustrated, the sensing system 140 may include a first pressure sensitive surface 142 and a second pressure sensitive surface 144. The first pressure sensitive surface 142 may be configured to detect a pressure exerted by the occupant on an upper portion of the seat base assembly 2 and transmit a signal indicative of the pressure to the controller. Similarly, the second pressure sensitive surface 144 may be configured to detect a pressure exerted by the occupant on the front portion of the seat base assembly 2 and transmit a signal indicative of the pressure to the controller. Based upon the pressure detected by at least one of the pressure sensitive surfaces 142, 144, the controller generates and transmits the control signal to the drive mechanism 130 to selectively move the adjustable support 100 to a predetermined position between the retracted position and the extended position according to an algorithm stored in the controller. It is understood that the sensing system 140 may include more or less pressure sensitive surfaces if desired.

As a non-limiting example, when the pressure exerted by the occupant on the upper portion of the seat base assembly 2 exceeds a predetermined threshold, the controller causes the drive mechanism 130 to selectively move the adjustable support 100 from the retracted position to the extended position. As another non-limiting example, when the pressure exerted by the occupant on the front portion of the seat base assembly 2 exceeds a predetermined threshold, the controller causes the drive mechanism 130 to selectively move the adjustable support 100 from the extended position to the retracted position.

Figure 27:
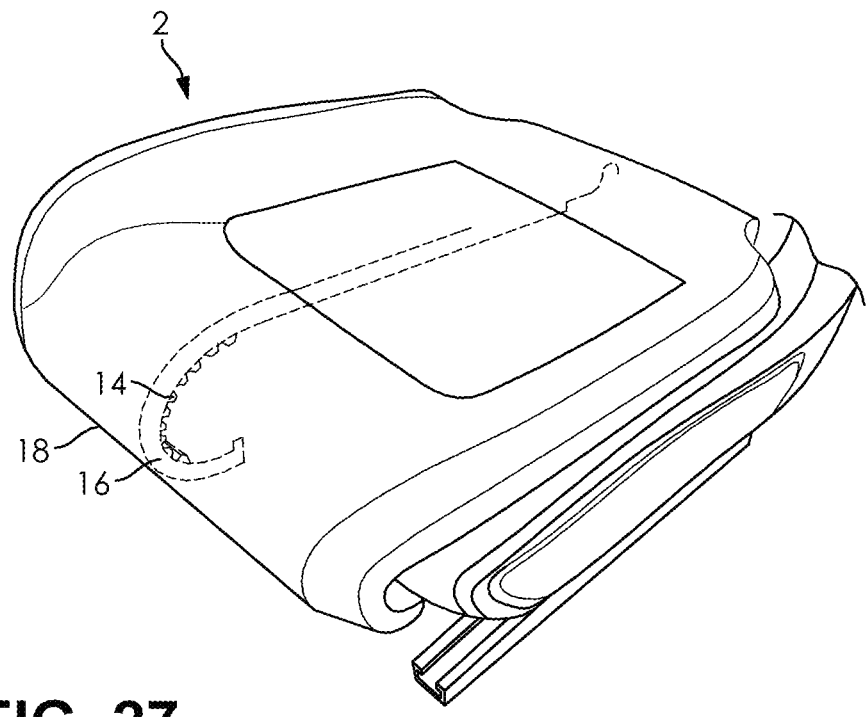
FIG. 27 is a left side front perspective view of the seat base assembly of FIG. 2, showing connections between the seat cover and the seat base substrate according to an embodiment of the presently described subject matter.
Figure 28:
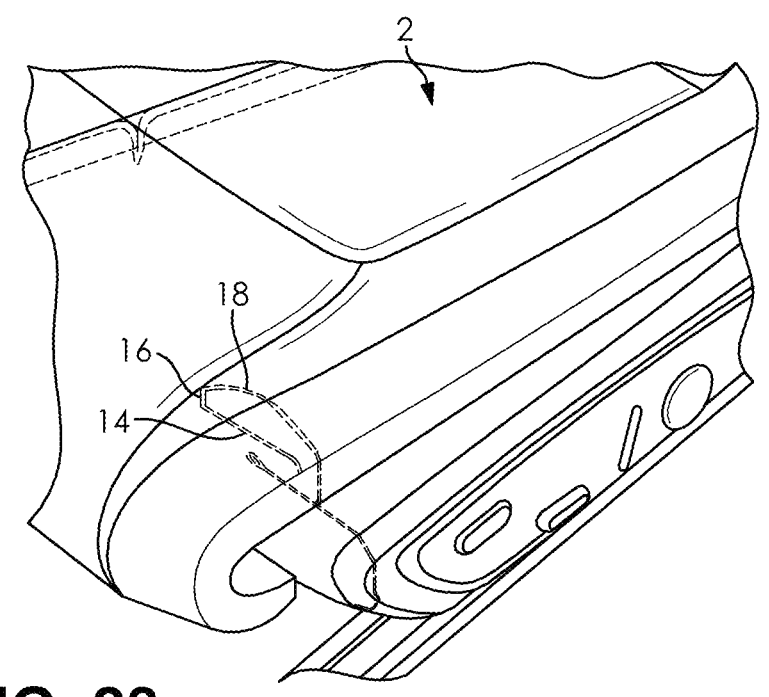
FIG. 28 is an enlarged left side front perspective view of a portion of the seat base assembly of FIG. 2, showing connections between the seat cover and the seat base substrate according to another embodiment of the presently described subject matter.

As discussed hereinabove, the seat base assembly 2 may include the cover 18. Referring now to FIGS. 9-11 and 22-23, the seat cover 18 may be wrapped around the adjustable support 100 and connected to portion of the seat base assembly 2 located underneath the drive mechanism 130. In an embodiment depicted in FIGS. 12-14, the seat cover 18 may be wrapped around the adjustable support 100 and connected to the lower portion 104 of the flexible main member 101, which may be connected to the portion of the seat base assembly 2 located underneath the drive mechanism 130. In another embodiment shown in FIGS. 15-19, the seat cover 18 may be wrapped around the adjustable support 100 and connected to the movable member 132 of the drive mechanism 130. More preferably, the seat cover 18 may be connected to a hook element 146 formed on the movable member 132 of the drive mechanism 130. In yet other embodiments illustrated in FIGS. 20 and 21, the seat cover 18 may be wrapped around the adjustable support 100 and connected to the lower portion 104, shown in FIGS. 4-6 and 8, of the flexible main member 101, which may be connected to the movable member 132 of the drive mechanism 130. It is understood that each of the connections between the seat cover 18, the flexible main member 101, the movable member 132, and/or the portion of the seat base assembly 2 located underneath the drive mechanism 130 as well as the connections between the seat cover 18 and the seat base substrate 14 (as shown in FIGS. 27 and 28) may employ various connector types or connection methods such as mechanical fasteners, clips, clamps, hooks, bungees, drawstrings, tensioners, cords, wires, cables, and the like, for example.

Figure 29:
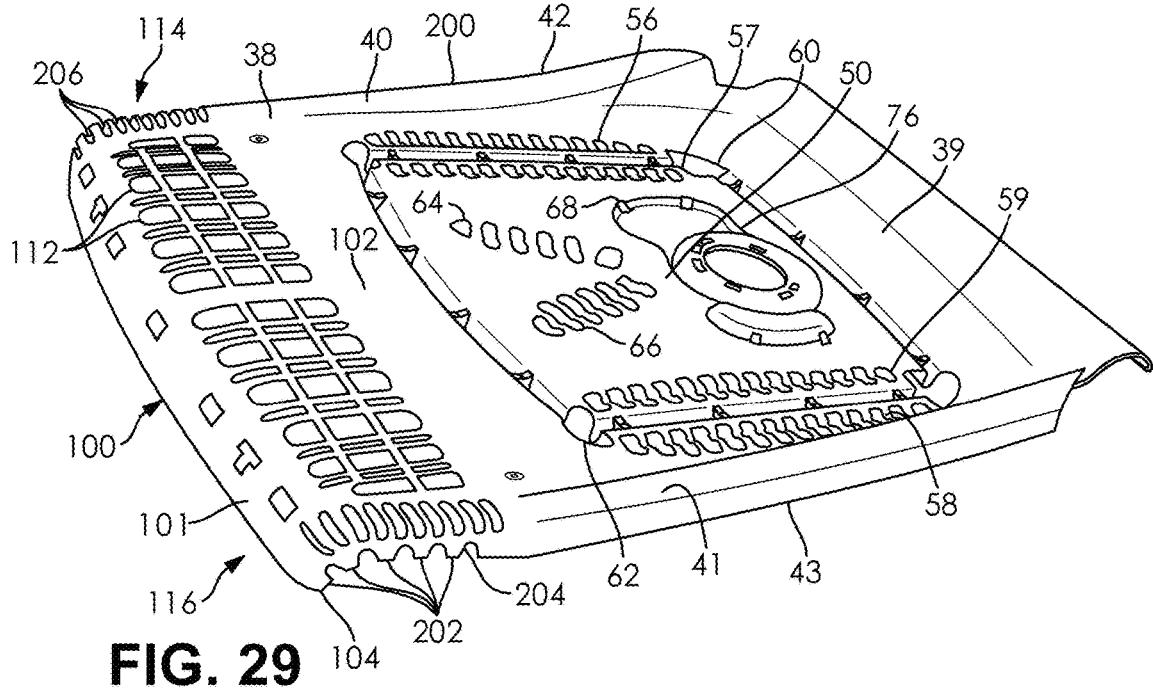
FIG. 29 is a top perspective view of another embodiment of a seat base substrate in an extended condition.
Figure 30:
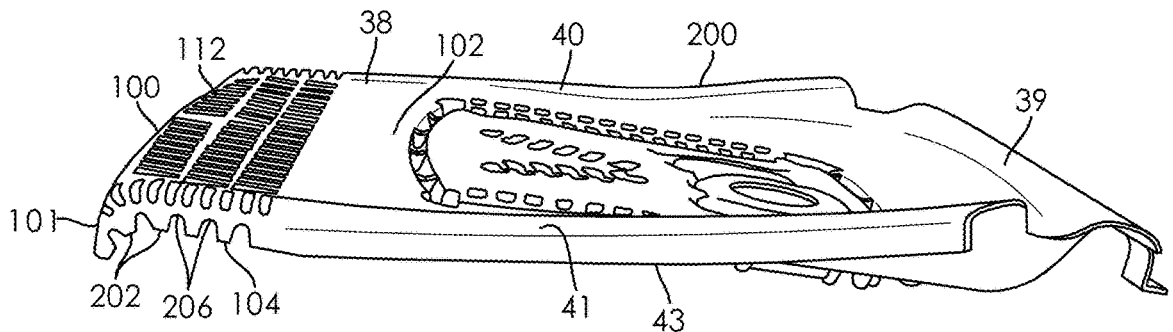
FIG. 30 is a side view of the seat base substrate of FIG. 29.
Figure 31:
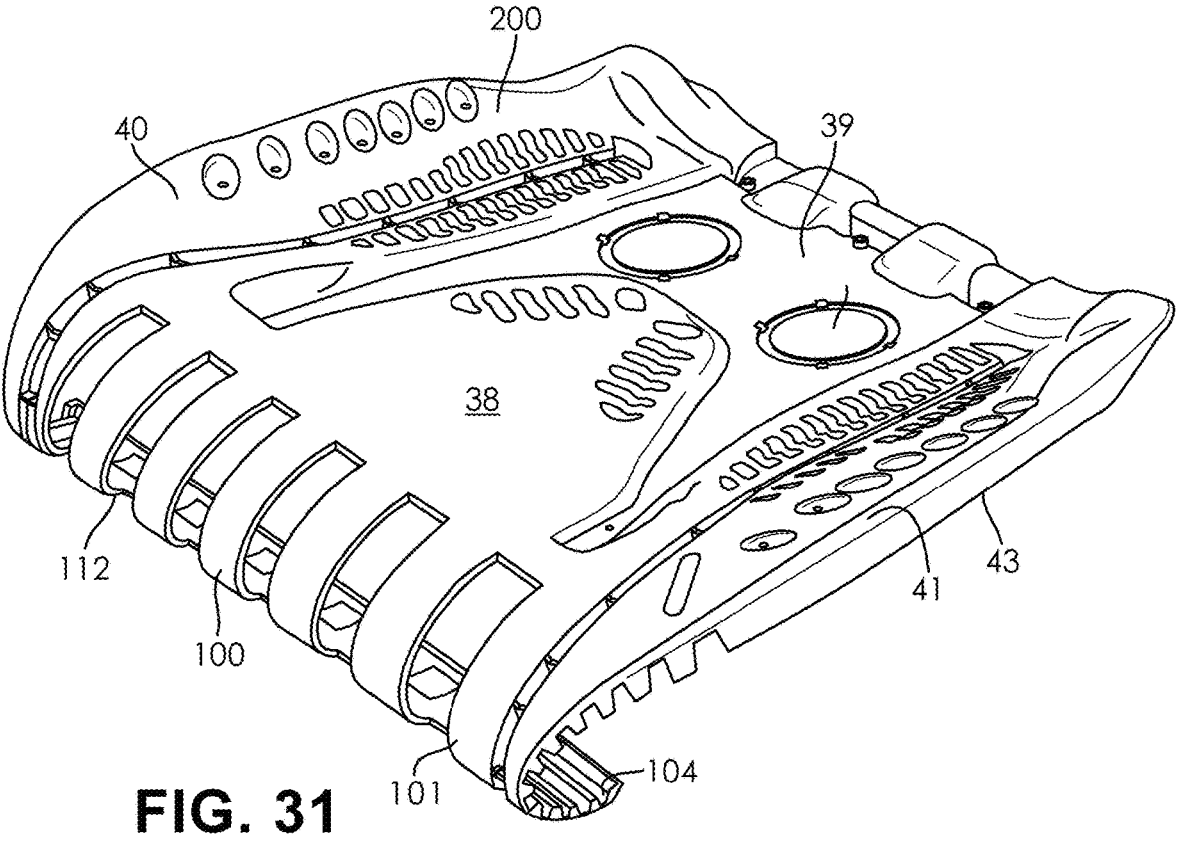
FIG. 31 is a top perspective view of the seat base substrate of FIG. 29 in a retracted condition.

Turning now to FIGS. 29-31, another embodiment of a seat base substrate 200 is depicted. The seat base substrate 200 may be as described above, thus the same reference numbers will be used for the same or similar features. New reference numbers may be used for new or different features.

In this embodiment, the flexible main member 101 is one piece, unitary and integrally formed with the main support portion 50 of the seat base substrate 14. In some embodiments, the lower portion 104 of the flexible main member 101 may have a plurality of edge teeth 202. The edge teeth 202 may be formed along an outboard edge 204 of one or both of the side members 114, 116. The edge teeth 202 may have the same size and shape as one another, or they may have different sizes and shapes. Gaps 206 may be located between the individual teeth 202. Here also the gaps 206 may have the same size and shape or the sizes and shapes may vary.

The combination of teeth 202 and gaps 206 may be varied along each outboard edge 204 to tune the flexibility of the flexible main member 101. By way of example, a greater number of larger teeth 202 may be used to stiffen the flexible main member 101 while fewer, smaller teeth 202 may be used to decrease the stiffness of the flexible main member 101.

The seat base substrate may have openings 112 in the flexible main member 101. One version of the openings 112 is depicted in FIGS. 29-30 and another version is depicted in FIG. 31. The openings can be sized and shaped to tune the flexibility of the flexible main member 101. In one example larger openings 112 spaced closely together may provide more flexibility and smaller openings 112 spaced far apart may provide less flexibility. Combinations of larger and small openings 112 spaced at different distances may be used.

This substrate 200 may also have one or more grooves 208 with retention features 210 therein. In this embodiment, the grooves 208 may extend generally between at least the side portions 40, 41 and the main support portion 50. The grooves 208 may extend generally parallel the side portions 40, 41.

In one embodiment, the grooves 208 may extend substantially continuously with a substantially constant cross-section. The cross-sectional shape may be such as U-shaped. In this instance, substantially continuously may include the situation where one or both of the grooves 208 are interrupted by apertures in the grooves 208. The grooves 208 may extend along, or be part of, the side members 114, 116. In one example, the grooves 208 may extend generally parallel the openings 112 in the flexible member 101.

As noted above, one or more of the grooves 208 may have retention features 210. The retention features 210 may be comprised of one or more teeth 210. The teeth 210 may be one-piece, unitary and integrally formed with the seat base substrate 200.

It may be that the teeth 210 are arranged in pairs along each groove 208. In some cases, some or all of the teeth 210 may be located at the top of the groove 208 so that they are generally coplanar with the upper portion 102 of the seat base substrate 200. In other cases, some or all of the teeth 210 may be recessed into the groove 208. The teeth 210 may be located in aligned pairs with one another, in offset pairs, or individual teeth 210 may be located along the groove 208 where they are not aligned with other teeth 210. The teeth 210 may or may not be aligned across from one another and/or vertically aligned with one another within the groove 208.

Figure 32:
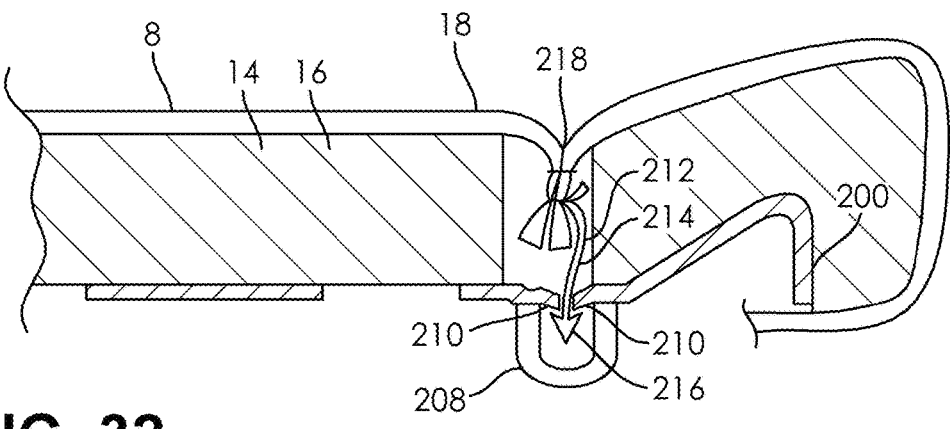
FIG. 32 is a schematic side view of one embodiment of a seat trim attachment to the seat base substrate.

The teeth 210, being formed of the same material as seat base the substrate 200, may have a degree of flexibility to them. The teeth 210 may be adapted to permit a portion of the seat cover 18 to be pushed into and/or beyond the teeth 210 so that the seat cover 18 is located at least selectively in the groove 200, as shown in FIG. 32.

In some embodiments, the seat cover 18 may be urged into the groove 208 and the teeth 210, and perhaps further secured thereto with one or more attachment members 212. The attachment members 212 may take different forms as well as sizes and shapes. Further, the different attachment members 212 may be used to secure the seat cover 18 to the seat base substrate 200.

By way of one example, the attachment member 212 may be such as a dart 212. The dart 212 may have a body portion 214 connected to a head portion 216. The dart 212 may be located at a seam 218 of the seat cover 18, or in an area where the seat cover 18 could be secured to the seat substrate 200.

The head portion 216, which may be a discrete individual dot or point, may be urged into the groove 208 and beyond one or more of the teeth 210. The teeth 210 make removal of the dart 212 difficult as the teeth 210 function to reduce the width of the groove 208 and the teeth 210 may also contact the head portion 216 to selectively block its removal.

The body portion 214 of the dart 212 may be such as strip of material or a series of strips of material connected to the head portion 216. The body portion 214 may be such as a strip of fabric that can be manipulated between and/or among the teeth 210. The body portion 214 may be connected to the seat cover 18 such as by sewing, adhesives, tying, welding or the like.

The above-described components may advantageously allow the seat cover 18 to be connected to the flexible main member 121 substantially continuously along the flexible main member 101 regardless of its position. For example, the body portion 214 of the dart 212, being constructed at least partially of a flexible fabric material, ensures that the body portion 214 can flex and bend as the seat base substrate 202, including the flexible main member 101, moves and adjusts position. Further, the head portion 216 of the dart 212 may pivot within its groove 208 to also accommodate movement. At least these features assist the seat cover 18 in closely following the flexible main member 101 during its movement without undesirably gathering or bunching.

Figure 33:
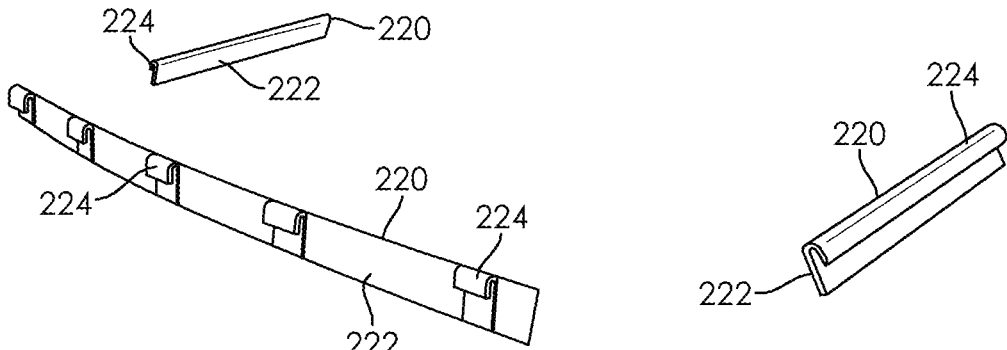
FIG. 33 depicts one embodiment of seat trim attachment strips.
Figure 35:
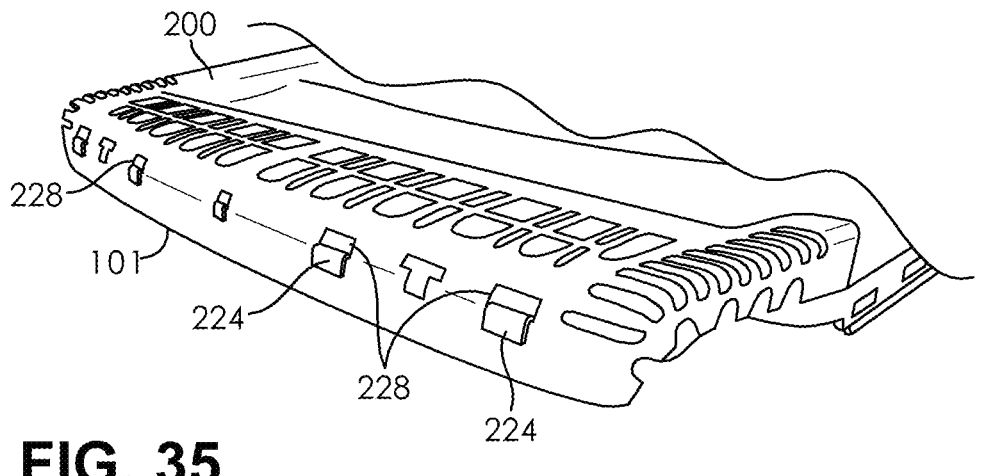
FIG. 35 is an upper perspective view of seat trim attachment strips and a seat base substrate.
Figure 36:
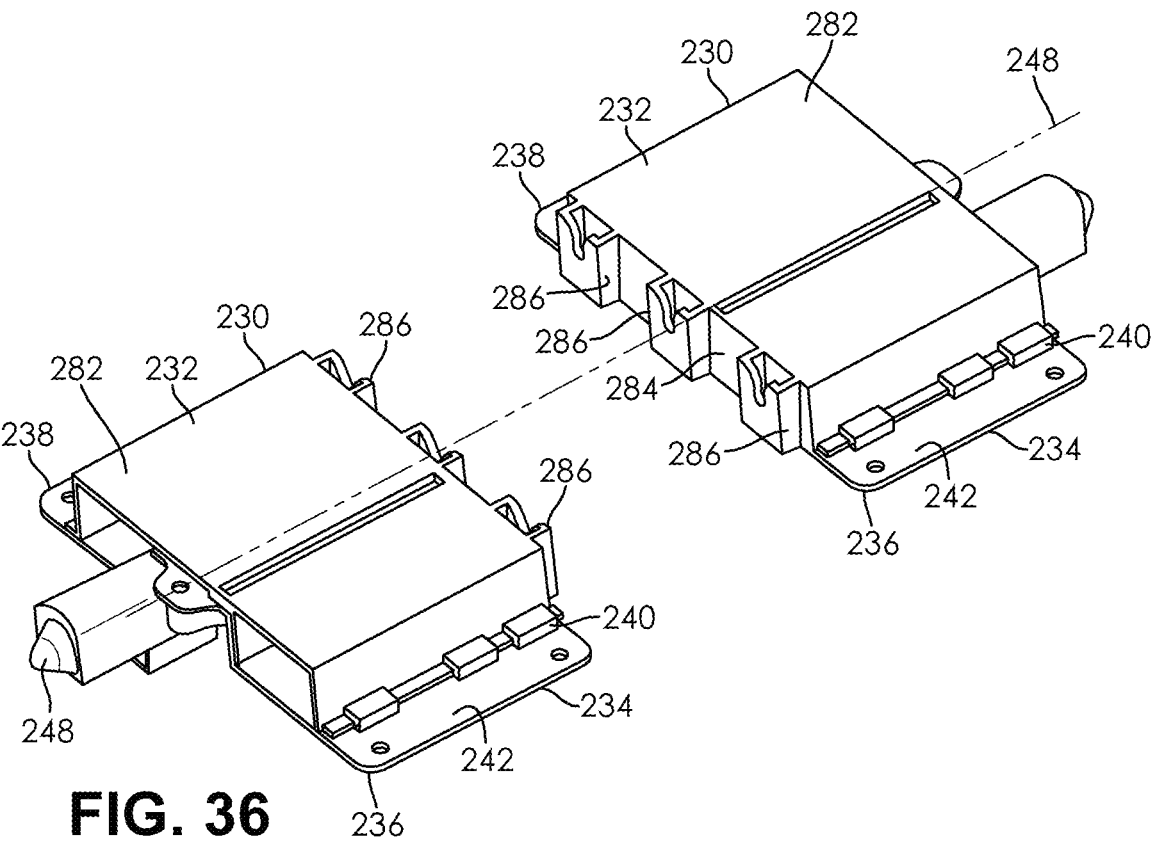
FIG. 36 is an upper perspective view of one embodiment of upper and lower slide members.
Figure 37:
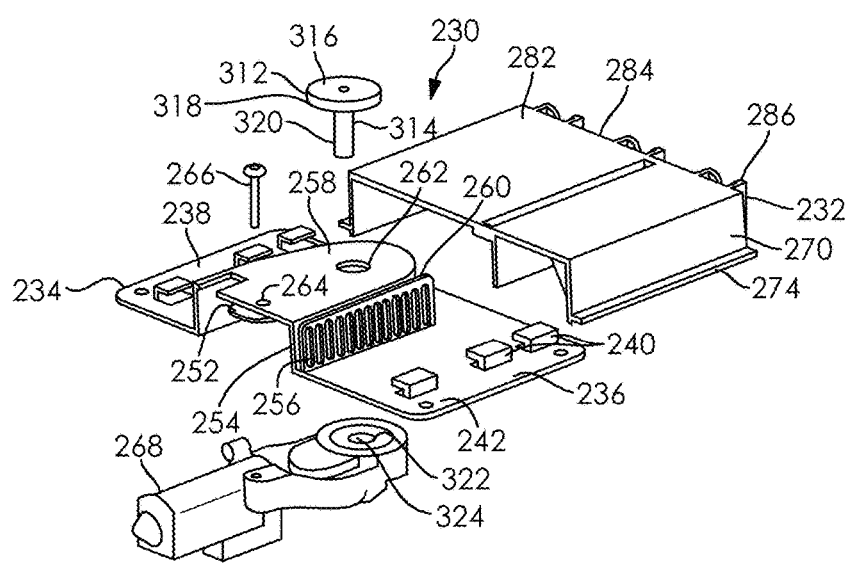
FIG. 37 is an upper perspective view of an exploded the upper and lower slide members, a motor, and pinion.
Figure 38:
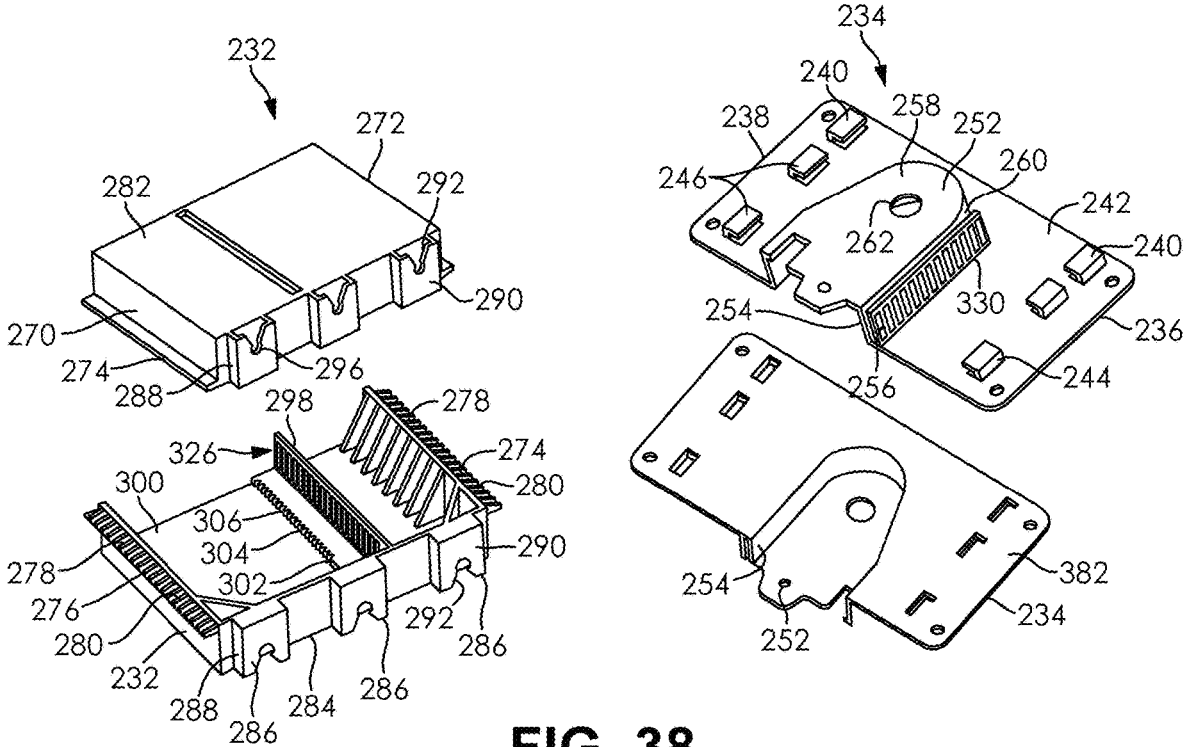
FIG. 38 are perspective view of the upper and lower slide members.
Figure 39:
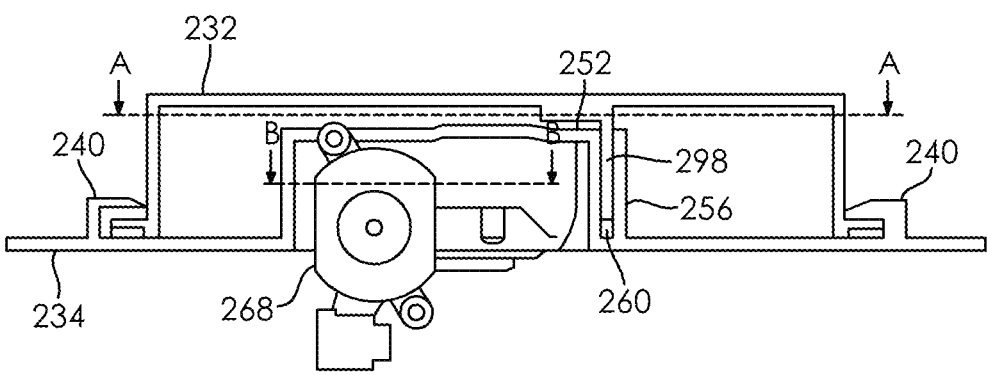
FIG. 39 is an end view of the upper and lower slide members, the motor and the pinion.
Figure 40:
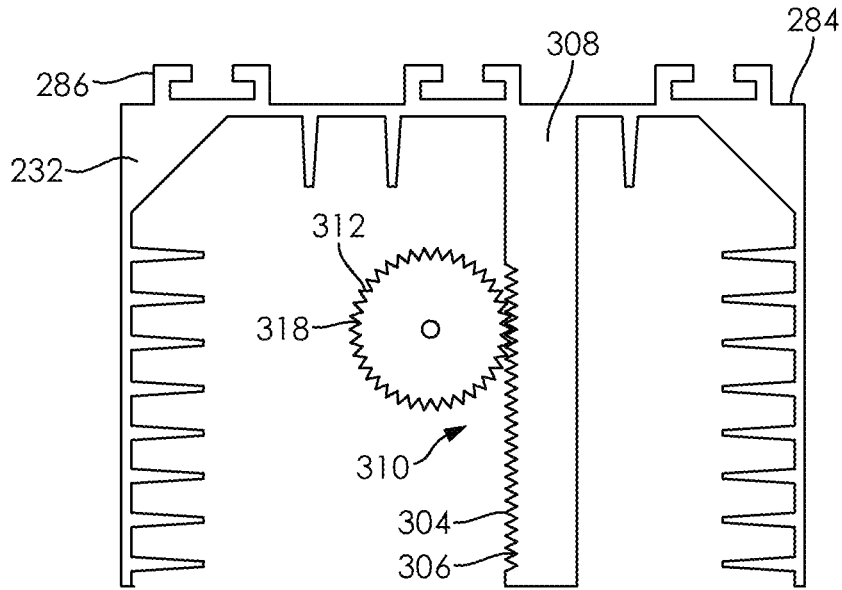
FIG. 40 is a top view along section line A-A of FIG. 39.
Figure 41:
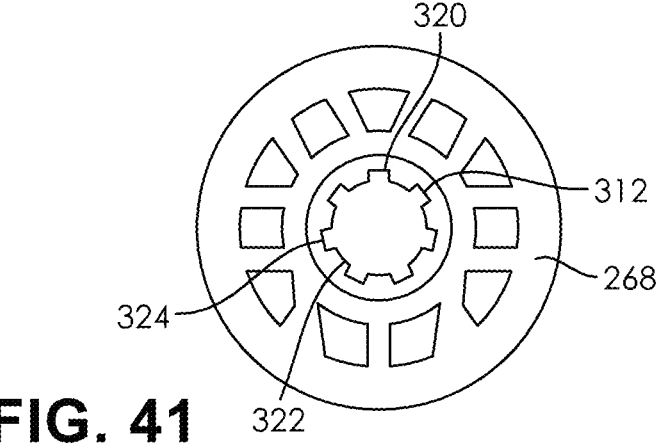
FIG. 41 is a top view along section line B-B of FIG. 39.

The seat cover 18 may also be connected to the flexible main member 101 via one or more connector strips 220. One embodiment of connector strips 220 is shown in FIG. 33. The connector strips 220 may have a body portion 222 and a hook portion 224. In one embodiment, the hook portion 224 may extend substantially along the body portion 222. This embodiment may be used to connect the seat cover 18 to a trim ring 226. For example, the hook portion 224 may extend over, such as snap over a portion of the trim ring 226, as shown in FIG. 35.

In another embodiment, there may be a plurality of hook portions 224 along the body portion 222. This embodiment, also shown in FIG. 35, may be used to connect the seat cover 18 to the front of portion 38 the seat base substrate 200. By way of example, the individual hook portions 224 may extend through hook apertures 228 in the front darts in 38 of the flexible main member 121.

In both embodiments, the seat cover 18 may be connected to the body portions 222 of the connector strips 220. Thus, from the above, it can be appreciated that the seat cover 18 wraps about the flexible main member 101 and the side portions 40, 41 to at least partially encase the seat base substrate 200.

Turning now to FIGS. 36-41, an embodiment of a drive mechanism 230 is depicted. The drive mechanism 230 may be comprised of an upper slide 232 and a lower slide 234.

The lower slide 234 may be connected to the trim ring 226. The connection may be such that the lower slide 234 is fixed to the trim ring 226, such as through mechanical fasteners.

The lower slide 234 may be one piece, unitary and integrally formed. However, in other embodiments, the slide 234 may be constructed of two or more pieces. Regardless of the number of pieces, the lower slide 234 may be constructed of a metal material, a plastic material or a combination thereof.

The lower slide 234 may have first and second side portions 236, 238. The side portions 236, 238 may be generally planar and coplanar with one another.

In some embodiments, slide tabs 240 may extend from an upper surface 242 of each side portion 236, 238. The slide tabs 240 may each have a first leg 244 that extends generally transverse from the upper surface 242. The slide tabs 240 may also have a second leg 246 that extends transverse the first leg 244, which may orient the second leg 246 generally parallel the upper surface 242.

In some embodiments, a plurality of slide tabs 240 may be located on each side portion 236, 238. It may be preferred that each plurality of slide tabs 240 on each side portion 236, 238 are generally aligned with one another. The alignment may be such as generally parallel a drive mechanism axis 268. The drive mechanism axis 248 may be generally parallel a longitudinal axis 250 of the seat base 8.

In some cases, the slide tabs 240 on one side portion 236, 238 may be located generally opposite the slide tabs 240 on the other side portion 236, 238.

The side portions 236, 238 may be located on either side of a motor housing 252. The motor housing 252 may have an upstanding wall 254 that extends generally transverse the upper surfaces 242 of the first and second side portions 236, 238. The upstanding wall 254 may define a generally curvilinear path from the upper surfaces 242 such that it creates a generally oval perimeter. While an oval perimeter is mentioned, other shapes may also be used.

Adjacent the upstanding wall 254 a first slot wall 256 may be provided on the second side portion 238. The first slot wall 256 may extend generally parallel the upstanding wall 254 but spaced apart therefrom. The first slot wall 256 may generally extend along the length of the upstanding wall 254 and have a height generally equal to an upper surface 258 of the motor housing 252. The spacing between the first slot wall 256 and the upstanding wall 254 may be substantially constant so as to form a generally constant width slot 260 therebetween.

In some embodiments, a pinion aperture 262 may be located in the upper surface 258 of the motor housing 252. The upper surface 258 of the motor housing 252 may also have one or more fastener apertures 264 therein. The fastener apertures 264 may be adapted to receive one or more fasteners 266 therethrough. The fasteners 266 may be connected to a motor 268 to secure the motor 268 and the lower slide 234 together.

The upper slide 232 may be one piece, unitary and integrally formed. However, in other embodiments, the slide 232 may be constructed of two or more pieces. Regardless of the number of pieces, the upper slide 232 may be constructed of a metal material, a plastic material or a combination thereof.

The upper slide 232 may have first and second side walls 270, 272. The first and second side walls 270, 272 may extend generally parallel one another. Each side wall 207, 272 may also have a slide rail 274, 276. Each slide rail 274, 276 may extend generally transverse its respective side wall

270, 272; the slide rails 274, 276 may extend generally parallel and generally coplanar with one another.

Each slide rail 274, 276 may have a plurality of teeth formed thereon. In one embodiment, the teeth 278 may extend substantially along the length of each rail 274, 276. The teeth 278 may be located on a bottom surface 280 of each slide rail 274, 276.

The upper slide 232 may have an upper wall 282 that connects each of the first and second side walls 270, 272. The upper wall 282 may extend generally transverse the side walls 270, 272. The upper wall 282 may generally extend parallel each slide rail 274, 276, but the upper wall 282 is not coplanar with the slide rails 274, 276. The upper wall 282 also connects with a front wall 284 that may extend generally transverse the side walls 270, 272.

In some embodiments, the front wall 284 may have one or more attachment features 286 attached, or connected, thereto. The attachment features 286 may be the same as one another or they may have different sizes and shapes.

In one embodiment, an attachment feature 286 may have a two generally parallel lateral walls 288 extending generally transverse from the front wall 284 of the upper slide 232. The lateral walls 288 may extend generally parallel the first and second walls 270, 272, but may not be coplanar therewith. The attachment feature 286 may also have a forward wall 290 connected to each lateral wall 288. The forward wall 290 may extend generally transverse each lateral wall 288; the forward wall 290 may be generally parallel with, but not coplanar with, the front wall 284 by virtue of the lateral walls 288.

The attachment feature 286 may have a recess 292 in the forward wall 284. The recess 292 may be generally V or U shaped and may extend from an upper portion 294 of the forward wall 290 to a mid-portion 296 of the forward wall 290. The recess 292 may terminate in a circular or oval shape generally in the mid-portion 296 of the forward wall 290.

In some embodiments, three equally spaced apart attachment features 286 of all generally the same size and shape may be located across the forward wall 290.

The upper slide 232 may have a second slot wall 298 in some cases. The second slot wall 298 may extend from the upper wall 282 of the upper slide 232, such as in a transverse manner. The second slot wall 288 may extend from a lower surface 300 of the upper wall 282. The second slot wall 298 may extend generally parallel the first and second side walls 270, 272.

The second slot wall 298 may be adapted to selectively move in the slot 260 formed between the upstanding wall 254 and the first slot wall 256 when the upper slide 232 and the lower slide 284 are assembled. Thus, the second slot wall 298 may have a width that is less than the slot 260. Further, the second slot wall 298 extends generally parallel with both the upstanding wall 254 and the first slot wall 256. The second slot wall 298 may have a length that is substantially equal to the length of the first slot wall 256 and the upstanding wall 254. The slot walls 256, 298 assist in maintaining a fixed horizontal relationship between the upper and lower slides 232, 234.

Adjacent the second slot wall 298, a step 302 may be provided in or on the lower surface 300 of the upper wall 282 of the upper slide 232. In one embodiment, the step 302 is formed with the lower surface 300. An edge 304 of the step 302 may be provided with a set of teeth 306. The set of teeth 306 may such as internally formed generally extend along the edge 304 substantially the length of the edge 304. The edge 304 may be located generally parallel the drive mechanism axis 248. The edge 304 may be aligned or offset from the axis 248. The step 302, edge 304 and set of teeth 306 form a rack 308, such as for a combined rack and pinion system 310.

A pinion gear 312, which is part of the system 310, may be provided having a stem 314 portion and a head portion 316. The head portion 316 may have a larger diameter than the stem portion 314. A perimeter of the head portion 316 may have a plurality of circumferentially extending teeth 318. The stem portion 314 may have a plurality of circumferentially extending splines 320. The teeth 318 may be of a greater number than the splines 320.

The teeth 318 of the head portion 316 on the pinion gear 312 are adapted to mesh with the set of teeth 306 on the edge portion 304 on the lower slide 234. Thus, the head portion 316 is coplanar with the rack 308 when the upper and lower slides 232, 234 are assembled.

The pinon gear stem portion 314 extends downward from the head portion 316 in a generally transverse manner. The stem portion 314 is located within a motor 268. The motor 268 has a stem receiving portion 322 that has complementary teeth 324 to the splines 320 on the stem 314. The splines 320 on the stem 314 are received in the teeth 324 of the motor 268 to mesh therewith. Thus, when the motor 268 is energized, it will turn the pinion gear 312. The motor 268 can be energized such that the pinion gear 312 can be turned in the clockwise or counterclockwise direction.

The motor 268 is received, at least partially, within the motor housing 252 of the lower slide 234. The motor 268 may be secured to the lower slide 234 through one more mechanical fasteners 266 that extend through the fastener aperture 264 in the upper surface 242 of the lower slide 234 and into the motor 268.

When the motor 268 turns the pinion gear 312 in one direction, the head portion 316 of the pinion gear 312, being engaged with the rack 328, causes the upper slide 232 to move with respect to the lower slide 234 along the drive mechanism axis 248. The upper slide 232 may move until a rear end 326 of the second slot wall 298 is adjacent a forward end 328 of the first slot wall 256. When the motor 268 turns the pinion gear 312 in an opposite direction, the upper slide 232 may move until the forward ends 328, 330 of the first and second slot walls 256, 298 are adjacent one another.

The slide rails 274, 276 of the upper slide 232 may move within the slide tabs 240 of the lower slide 234. The rails 274, 276 and tabs 240 assist in maintaining a fixed vertical and horizontal (e.g., lateral) relationship between the upper and lower slides 232, 234.

Figure 42:
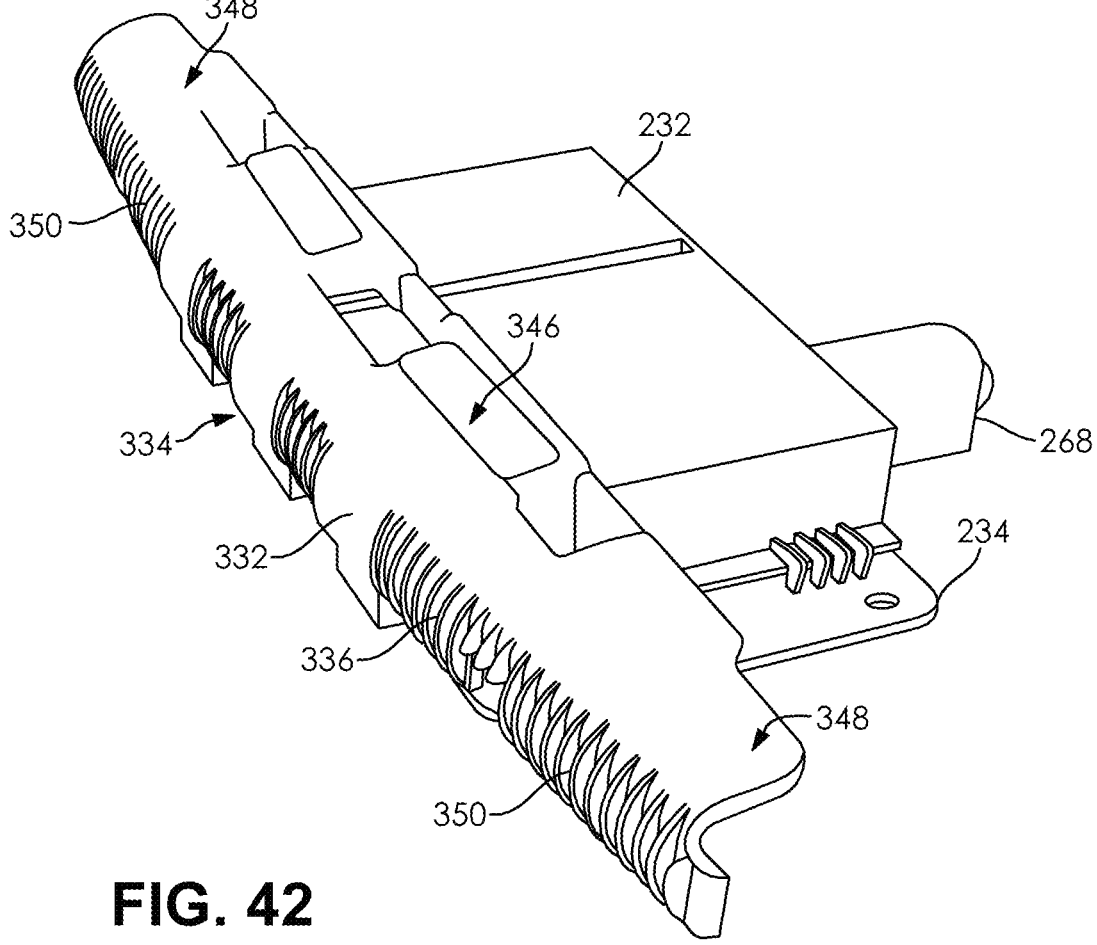
FIG. 42 is an upper perspective view of one embodiment of a pusher located on the upper and lower side members.
Figure 43:
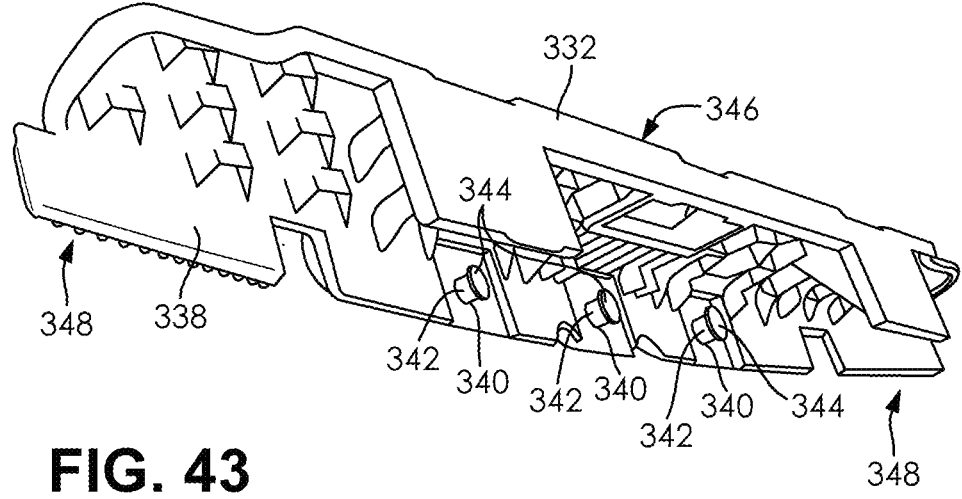
FIG. 43 is a rear perspective view of the pusher of FIG. 42.
Figure 44:
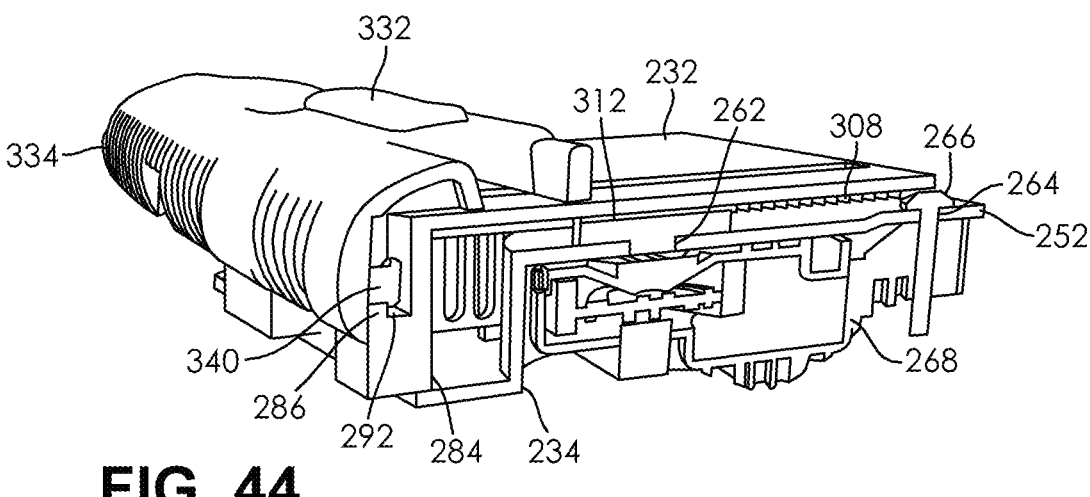
FIG. 44 is a cut away perspective side view of the pusher, the upper and lower slide member and the motor.

The attachment features 286 on the front wall 284 of the upper slide 232 may receive a portion of a pusher 332 therein, as may be appreciated in FIGS. 42-44. The pusher 332 may be unitary, one piece and integrally formed.

The pusher 332 may have a forward portion 334 with forward and rear surfaces 336, 338. The rear surface 338 may have one more buttons 340 formed thereon. The buttons 340 may have a body portion 342, which may be generally cylindrical, but other shapes may be used. At the end of the body portion 342, a head portion 344 of the button 340 may be provided. The head portion 344 may be generally circular and it may have a larger diameter than the body portion 342.

In one embodiment, there may be three buttons 340 for each of the three attachment features 386 on the front wall 284 of the upper slide 230. The buttons 340 are adapted to be selectively located at least partially within the attachment features 286. The buttons 340 can be removed from the attachment features 286 to enable different pushers 332 of different sizes and shapes to be attached to the upper slide 232.

Preferably, the pusher 332 being connected to the upper slide 232, moves with the upper slide 232 upon selective movement of the upper slide 232.

The pusher 332 may have a central portion 346. The central portion 346 may generally extend parallel, but not coplanar with, the upper wall 282 of the upper slide 232. The central portion 346 may have a curved or tapered shape such that (lateral) outboard end portions 348 of the pusher 332 may have a smaller width compared with the central portion 346 of the pusher 332. This may provide the forward portion 334 with a swept profile.

The pusher 332 overlaps the upper and lower slide 232, 234 where the two are connected. However, in some cases, the outboard end portions 348 of the pusher 332 may extend beyond the upper slide 323 and the lower slide 234, such as in a cantilevered fashion.

The forward portion 334 may be connected to the central portion 346. The forward portion 334 may extend generally transverse the central portion 346. The forward portion 334 may have a plurality of ribs 350 formed therewith. The ribs 350 may provide the forward portion 334 with a curved, or partially rounded, shape substantially along the length of the pusher 332.

The forward portion 334 of the pusher 332 may extend substantially the lateral width of the flexible main member 101. As a result, the pusher 332 may contact and/or move all, or substantially all, of the flexible main member 101. This advantageously provides continuous movement and support for the flexible main member 101 as it moves and changes shape.

Figure 45:
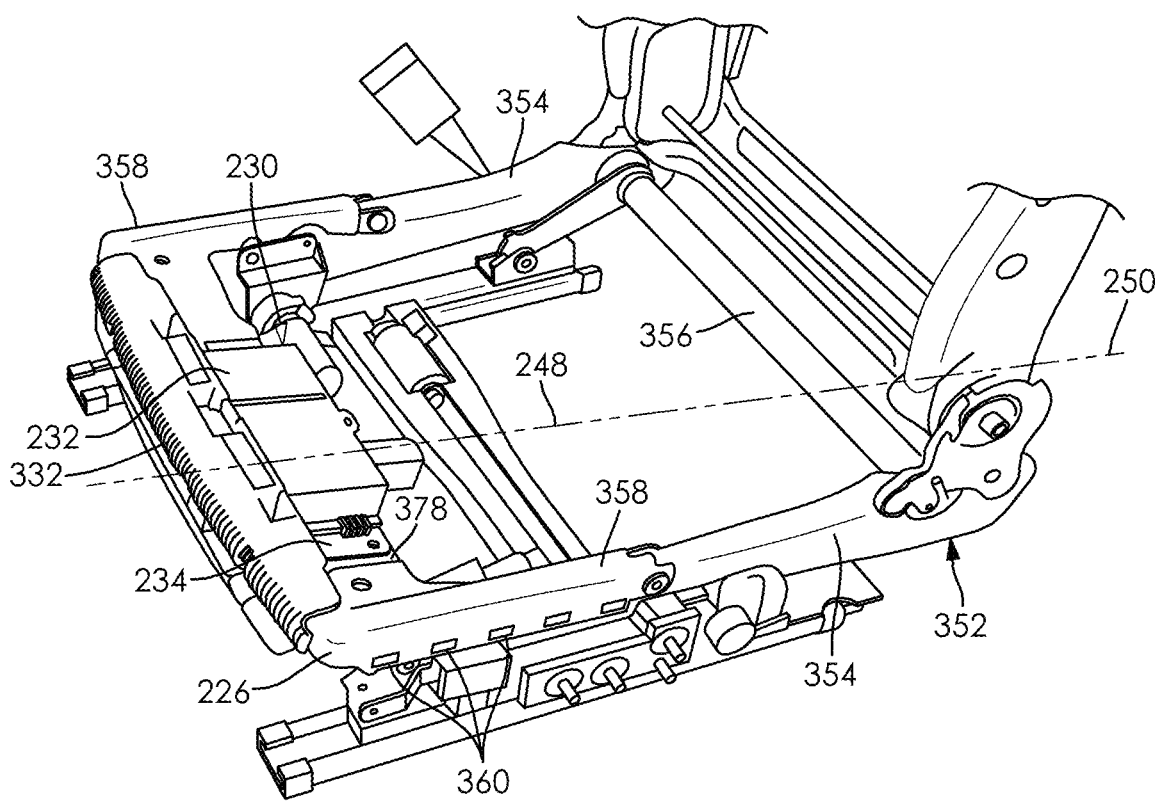
FIG. 45 is an upper perspective view of a seat frame with the pusher, the upper and lower slide members and one embodiment of a trim ring.
Figures 46, 47:
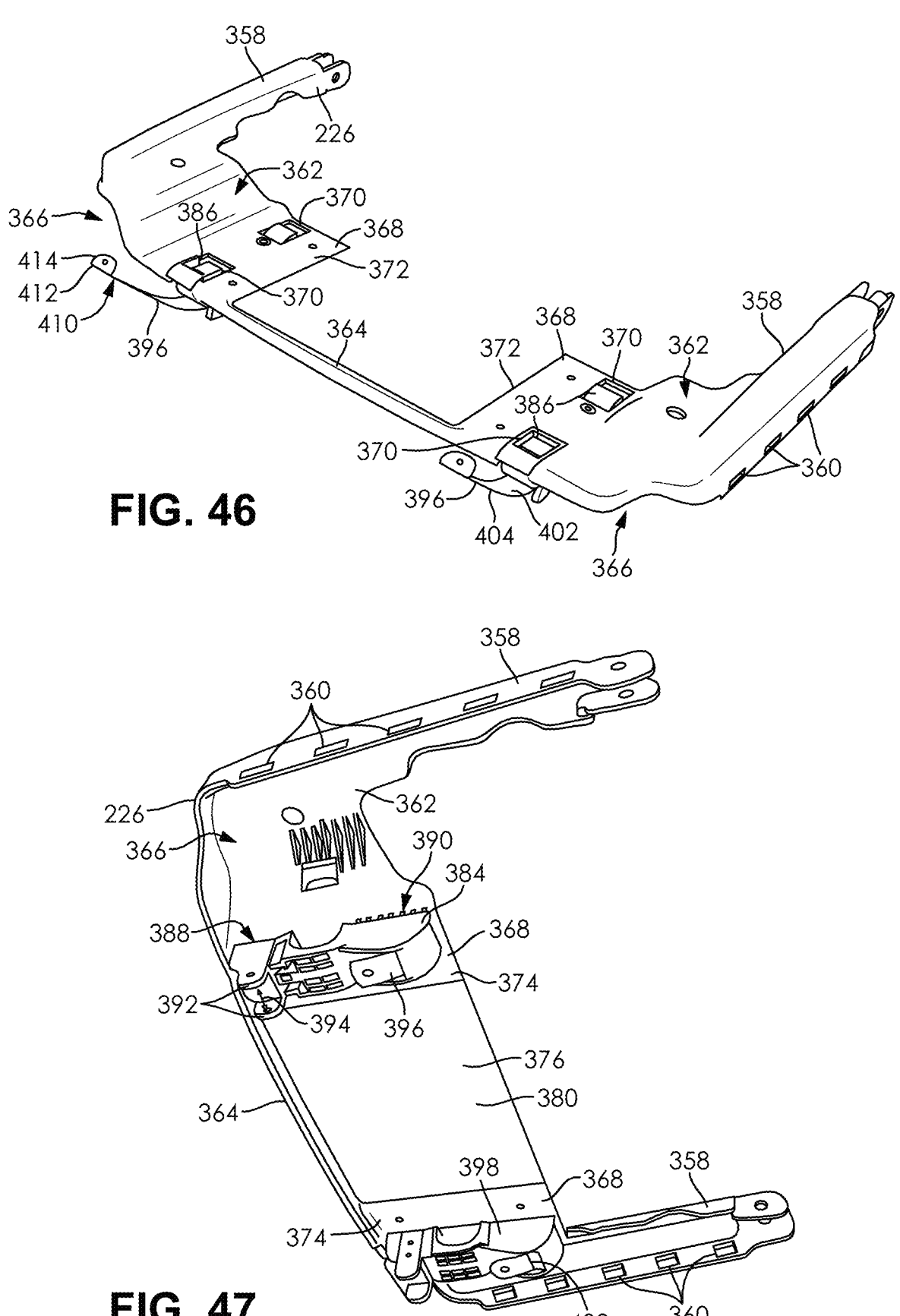
FIG. 46 is an upper perspective view of the trim ring.
FIG. 47 is a lower perspective view of the trim ring with one embodiment of spring housings.

Turning now to FIGS. 45-47, another embodiment of seat base assembly 352 is depicted. The seat base assembly 352 may be as described above at 2 and/or may have two generally spaced apart, parallel lateral portions 354 connected at least by a rear bar 356. The rear bar 356 may extend generally transverse the lateral portions 354.

In this embodiment, the seat base assembly 352 may have a trim ring 226 connected thereto. The trim ring 226 may have two arms 358 that extend at least partially along the lateral portions 354 of the seat base assembly 352. It may be that the arms 358 do not extend to the rear bar 356. In some cases, the arms 358 may at least partially overlap the lateral portions 354. The arms 358 may be secured to the lateral portions 354 by mechanical fasteners, clips, snap fittings or the like.

In some embodiments, the two arms 358 of the trim ring 226 may be connected to one or both of the lateral portions 345 of the seat base assembly 352 in a selectively moveable, or pivotable manner. In one example, the two arms 358 may be connected at their rear end portions to the lateral portions 345 with hinges or one or more connectors that function in a hinge-like manner. The latter structure may be such as flexible tabs that extend from the arms 358 to the lateral portions 345.

The structure mentioned above may permit the trim ring 226 to provide a tilt function with respect to the lateral portions 345. By way of one example, a motor may be connected to the seat base assembly 352. The motor may be connected, directly or indirectly, to the trim ring 226. The motor may urge at least the forward portions of the arms 366 vertically from the lateral portions 345 to provide a tilt feature.

In some cases, each arm 358 may have one or more trim apertures 360 formed therein. It may be that a plurality of trim apertures 360 are formed along each arm 358, and the plurality of apertures 360 may extend generally parallel their respective lateral portion.

Two transition portions 362 extend between the trim ring arms 358 and a connector strip 364. The transition portions 362 may be located at forward portions 366 of the arms 358. The transition portions 362 may include spring housing connector flats 368. In some embodiments, the flats 368 may be nonplanar with the trim rings arms 358, and may be located below the arms 358. The connector strip 364 may extend between the flats 368 and span the distance between the arms 358.

In some cases, no other part of the trim ring 226 extends between the arms 358 so that the arms 358 and connector strip 364 generally have a C-shape. It may be that the center portion of the C is generally open and free of structure from the arms 358 and/or the connector strip 364.

The flats 368 may have apertures 370 extending from an upper surface 372 of each flat 368 continuously through to a lower surface 374 of each flat 368. The apertures 370 may be in pairs where one pair is located adjacent one transition portion 362 and the other pair is located adjacent the opposition transition portion 362.

In some cases, a mounting plate 376 may be located between the flats 368. The mounting plate 376 may have a generally planar upper surface 378 and a generally planar lower surface 380. The mounting plate 376 may be part of the trim ring 226, or it may be separately formed and attached thereto.

A lower surface 382 of the lower slide 234 may be connected to the upper surface 378 of the mounting plate 376. The connection may such as a fixed connection so that the lower slide 234 is stationary with the plate 376. Mechanical fasteners may be used to connect the lower slide 234 to the plate 376.

The trim ring 226 described above provides a very compact attachment structure for the drive mechanism 230. A compact package for the drive mechanism 230 permits the seat base assembly 352 to have a low profile. The low profile is achieved in part by nesting the upper and lower slides 232, 234, directly mounting the lower slide 234 on the trim ring 226, which has the lower mounting plate 276, and providing the pusher 332 on the front wall 284 of the upper slide 232. Thus, a compact package is provided both longitudinally and vertically.

One or more spring housings 384 may be located on the lower surface 380 of the plate 376. In some embodiments, two spring housings 384 are located on the plate 376. The spring housings 384 may be at least partially located in the apertures 370 in the flats 368 to secure the housings 384 to the trim ring 226. In some cases, the spring housings 384 may have clips, or tabs, that at least partially extend through the apertures 370. The spring housings 384 may have clips 386 at forward and rear end portions 388, 390 of the housings 384. The forward clips 386 are adapted to be at least selectively received in the forward apertures 370 and the rear clips 386 are adapted to be at least selectively received in the rear apertures 370. The clips 386 may extend through the apertures 370 and they may be located above and/or in contact with the upper surface 372 of the flats 368. As such, the clips 386 function to retain the housings 384 against the lower surface 374 of the flat 368.

In some embodiments, the spring housings 384, and/or the trim ring 226, may each have one or more spring guides 392. The spring guides 392 may be located adjacent the forward end portions 388 of the housings 384. The guides 392 may extend generally transverse the lower surface 374 of the flat 368. It may be preferred that at least two spring guides 392 are located at each forward end portion 388 of each housing 384. The at least two spring guides 392 may be generally located parallel one another. A constant distance gap 394 may separate the two spring guides 392.

The spring guides 392 may be adapted to guide spring members 396 as they move. More particularly, the spring guides 392 may act as a funnel guiding the spring members 396 into spring containers. The springs move within the respective guides as the springs move with the flexible main member.

Each spring housing 383 may also have a spring container 398. The spring container 398 may be located adjacent the rear end portion 390 of the spring housing 383. The spring container 398 may be a generally hollow structure with a curvilinear, oval or circular interior, which may be appreciated from FIG. 48. The spring container 398 may be entirely enclosed or partially enclosed.

It may be preferred that the spring container 398 has a spring aperture 400. The spring aperture 400 may be adapted to receive the spring member 396 therein. The aperture 400 may permit selective movement of the spring member 396 through the aperture 400. For example, the spring member 396 may selectively move into and out of the aperture 400.

In one embodiment, the spring member 396 may be ribbon-like in its shape. For example, the spring member 396 may have an upper surface 402 and a lower surface 404 where the two surfaces 402, 404 define a generally constant thickness between them. The spring member 396 may have a substantially constant width as well.

A first end 406 of the spring member 396 may be located within the spring container 398. The first end 406 may be secured within the spring container 398. A first end portion 408, connected to the first end 406, may be selectively located within the spring container 398. The first end portion 408 may be able to selectively roll up within the spring container 398, where the first end portion 408 may roll up, or wind up, on itself in a spiral.

Figure 34:
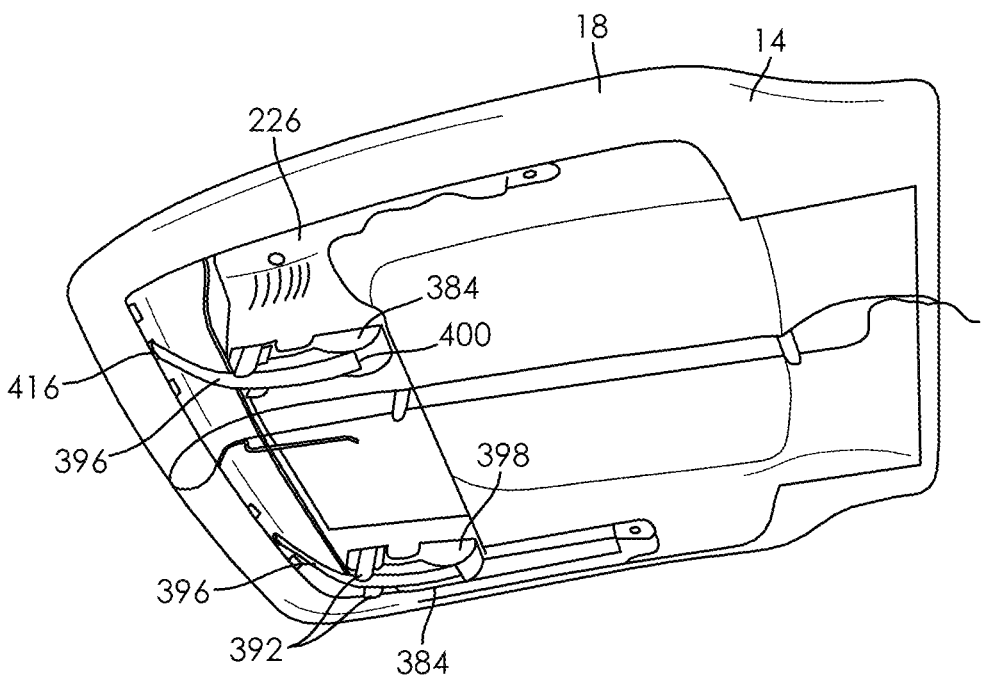
FIG. 34 is a lower perspective view of one embodiment of a trim ring and on a trimmed seat.

The spring member 396 may have a second end portion 410 that extends from the spring container 398. The second end portion 410 may terminate in a second end 412. The second end 412 may have an angled flange portion 414 formed therewith. The second end 412 and/or the flange portion 414 may be selectively connected to the seat base substrate 200. In one embodiment the second end 412 and/or flange portion 414 may extend through a spring member aperture 416 in the seat base substrate 200, such as shown in FIG. 34.

In some embodiments, there may be two spring members 396, each connected to respective spring containers 398. The spring members 396 and their spring containers 398 may be spaced apart from one another on the lower surface 380 of the mounting plate 376.

The seat base substrate 200 may be formed in a substantially planar state, as shown in FIGS. 29-30. In this state, the seat base substrate 200 may be in a substantially untensioned condition. In other words, in this condition there are generally no external forces applied to the seat base substrate 200 through other structures.

Figure 48:
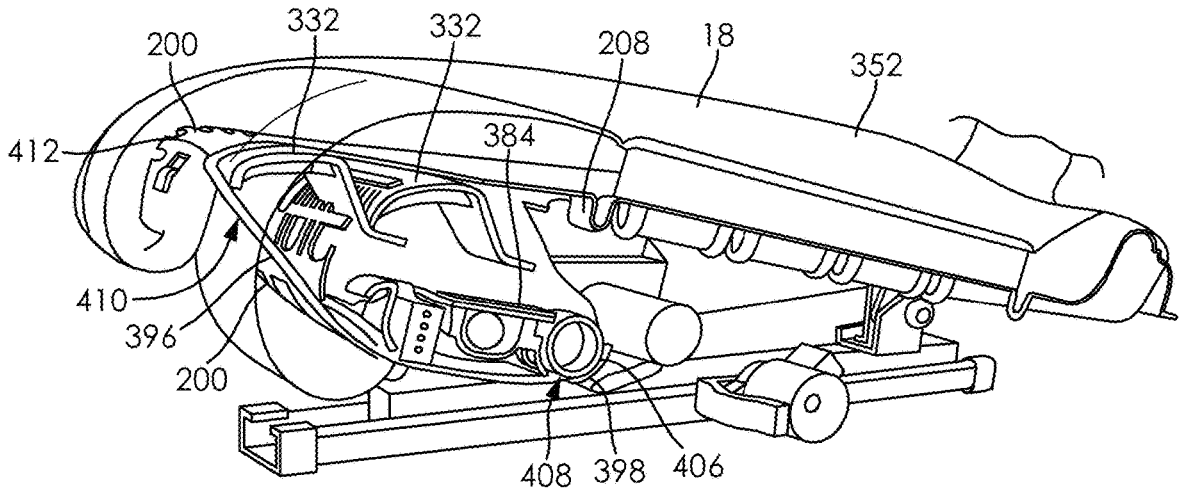
FIG. 48 is a cut away side view of one embodiment of a seat base assembly.

Tension maybe applied to the seat base substrate 200 through the spring members 396. For example, the spring members 396 may be used to curl and hold a portion the flexible main member 200, such as the flexible main member 101, under itself as shown in FIGS. 31 and 48. The flexible main member 200 may take on a C-shaped cross section in this state.

The spring members 396 may also urge the flexible main member 200 into direct facing contact with at least the forward portion 334 of the pusher 332 substantially along its length. The spring members 396 may also urge the flexible main member 200 into direct facing contact with the central portion 346 of the pusher 332 as well. The spring members 396 cause this contact regardless of the position of the flexible main member 200. For example, the spring members 396 urge the flexible main member 200 into contact with the pusher 332 when the flexible main member 200 is in the position depicted in FIGS. 29-30, and FIGS. 31 and 48, and all positions in between.

The seat cover 18, being attached directly to the seat base substrate 200 at least in some locations, is also tensioned. The spring members 396 may provide a constant force spring tension to the seat cover 18 and/or the flexible main member 200.

Figure 50:
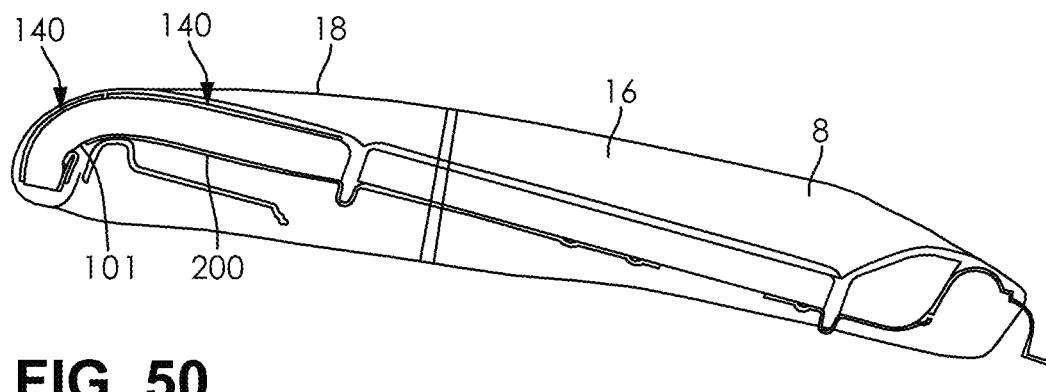
FIG. 50 is a cut away side view of the seat base assembly having one embodiment of occupant sensing systems.

In some embodiments, the seat base assembly 2 may be provided with one or more occupant sensing systems, such as 140. In one example, the systems 140 may be such as one or more strain gauges and/or one or more capacitive mats. The systems 140 may be integrally formed with the seat cover 18, or otherwise attached to the seat cover 18, as shown in FIG. 50, or it maybe associated with other parts of the seat base assembly 2, including the cushion member 18, the seat base substrate 200, and/or the flexible main member.

The systems 140 may be used to determine the size and/or shape of the occupant on the seat base assembly 2. The systems 140 may use the sensed information to adjust the seat base substrate 200, as described below, to create a custom seating condition for individual occupants. For example, the systems 140 may sense that the occupant needs more or less side bolster support and the systems 140, along with one or more controllers and/or actuators, may adjust the seat base substrate 200 to provide the support.

As another example, it may be known that a certain length of the seat base substrate 200 provides a preferred level of thigh support for an occupant. The systems 140 can determine the pressure exerted by a seat occupant's thigh on the seat base substrate 200 and determine if the pressure is within an acceptable range. If the pressure is outside the acceptable range, the seat base substrate 200 can adjust its length and/or bolster support so that the pressure falls within the acceptable range.

The seat base assembly 200 must not only accept standard seating loads, but it must also accept certain point loads. These loads may be experienced if the seat base 8 is stood on, or perhaps knelt on, even for small amounts of time. These point loads may be much higher than the standard seating loads, and they may be highly localized.

Figure 49:
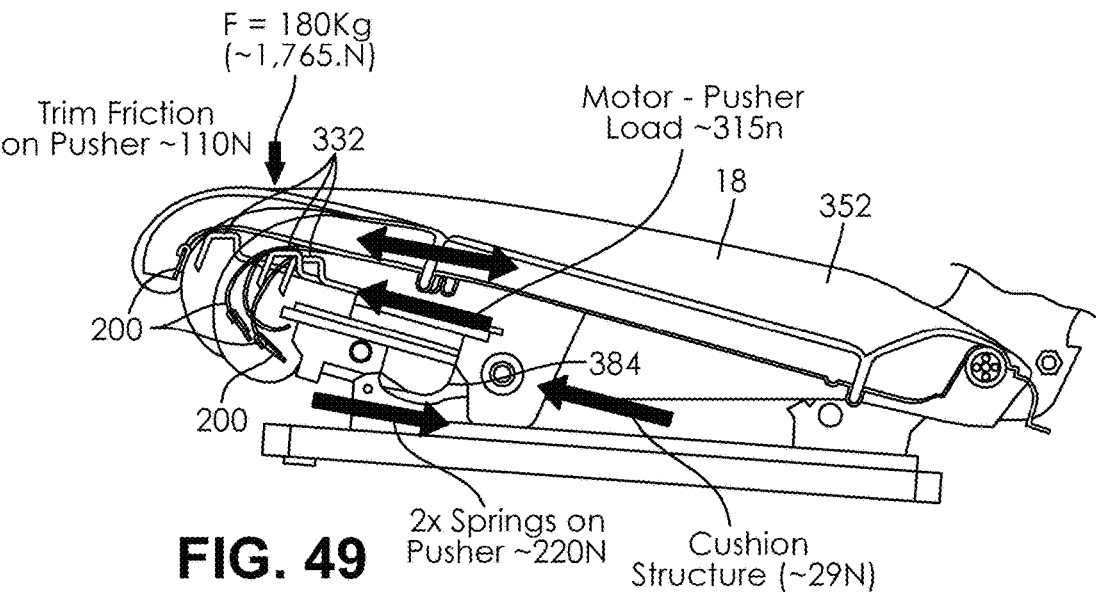
FIG. 49 is a cut away side view of the seat base assembly in various stages of movement.

The structures, including but not limited to the seat base assembly 200, the upper and lower slides 232, 234, the motor 268 and the pusher 332, described and depicted herein are constructed with such point loads in mind and thus they are adapted to accept such point loads without harm to any of the structures or components. FIG. 49 depicts one embodiment of the seat base 8 with loadings that are accommodated and accepted by these structures, as well as exemplary ranges of motion. FIG. 49 depicts the seat base 8 in the extended condition.

Figure 51:
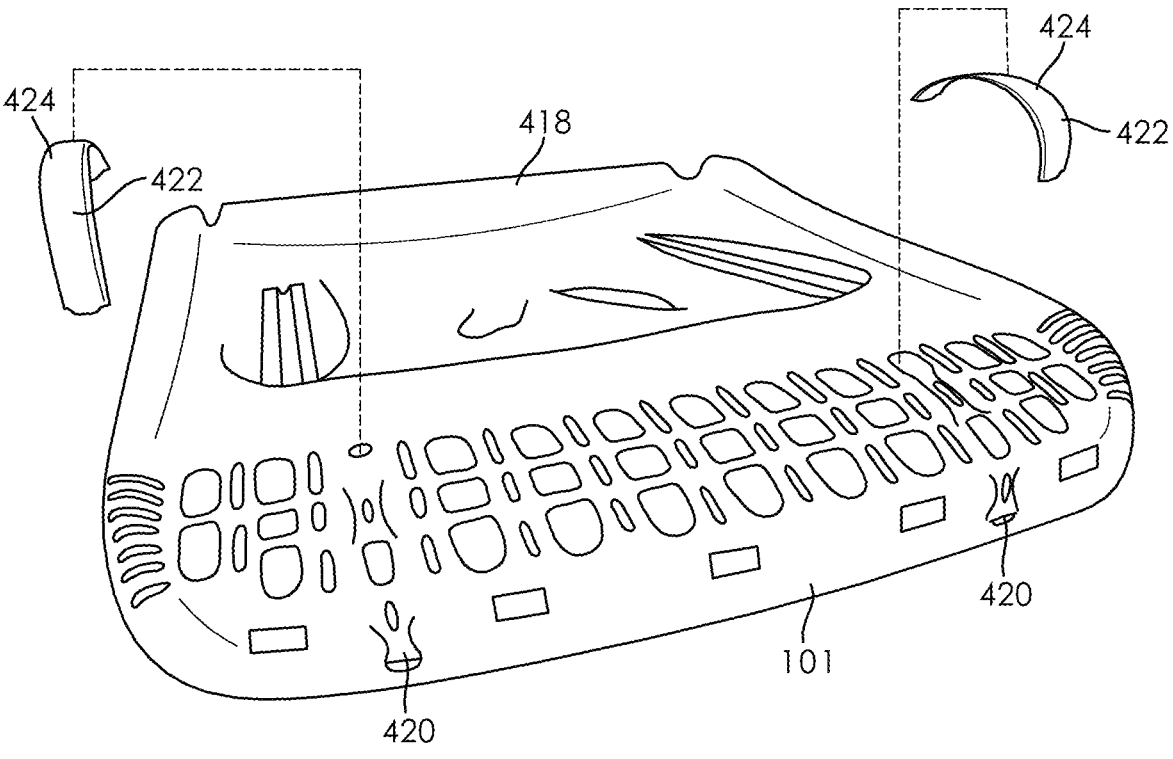
FIG. 51 is a front perspective view of a seat base substrate having spring strips exploded therefrom.
Figure 52:
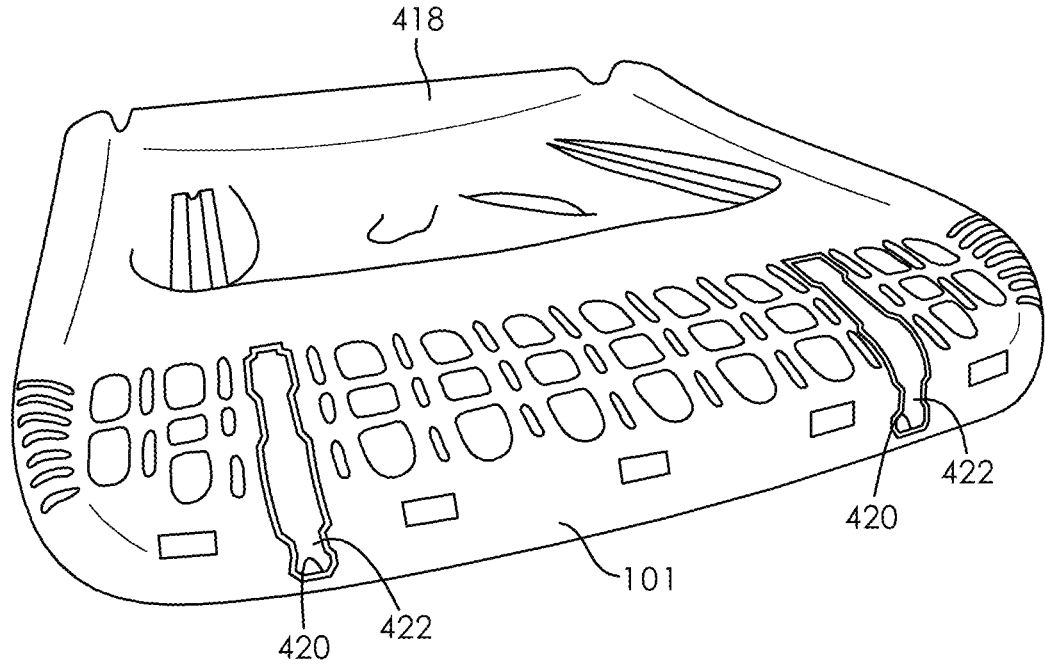
FIG. 52 is a front perspective view of the seat base substrate of FIG. 51 with the spring strips installed thereon.

Another embodiment of a seat base substrate 418 is depicted in FIGS. 51-52. The seat base substrate 418 may have the features as described above, and thus the same reference numbers will be used for the same or similar features.

In this embodiment, recesses or apertures 420 maybe provided in the seat base substrate, such as flexible main member 101. In some embodiments, the recesses 420 do not extend through the flexible main member 101 but instead may only be depressions. The recesses 420 may have a generally rectangular shape, but other shapes, such as oval, may be used. The recesses 420 may be located between the openings 112.

Spring members 422, which may be such as spring metal strips, such as spring steel, may be located in the recesses 420. The spring members 422 may have a complementary shape to the recesses 420. Further, the spring members 422 may be located in the recesses 420 so that an upper surface 424 of the spring members 422 is generally flush with the upper portion 102 of the flexible main member 101.

Each spring member 422 may be pre-curled to provide the members 422 with a position memory. For example, the members 422 may be provided with an arc that is a resting state or position of the members 422.

The members 422 urge the flexible main member 101 into a curled position, as shown in FIG. 52, as a resting state or position. The pusher 332 and associated mechanism can be used to move the flexible main member 101 into a flatter orientation, as shown in FIG. 51, however, this is against the force of the members 422. When the pusher 332 moves to a retracted position, the members 422 urge the flexible main member 101 back into a curled state. The members 422 may be used alone or in combination with the spring members 396.

While metal may be used for the construction of the members 422, other forcing materials may also be used in whole or in part with metal. Other such materials may be such as plastics and/or composite materials.

Figure 53:
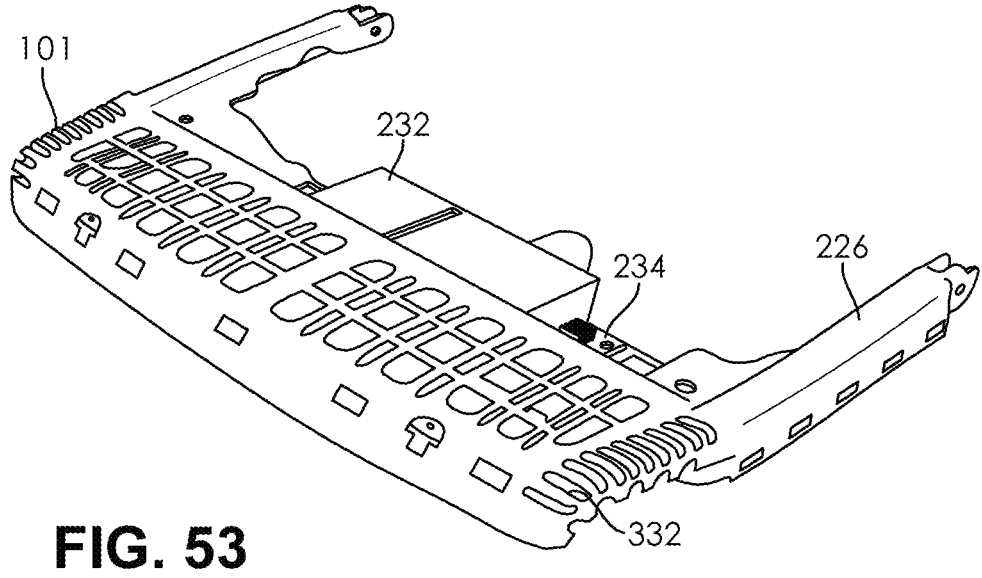
FIG. 53 is an upper perspective view of one embodiment of a flexible main member in an extended condition, a trim ring and upper and lower slide members.
Figure 54:
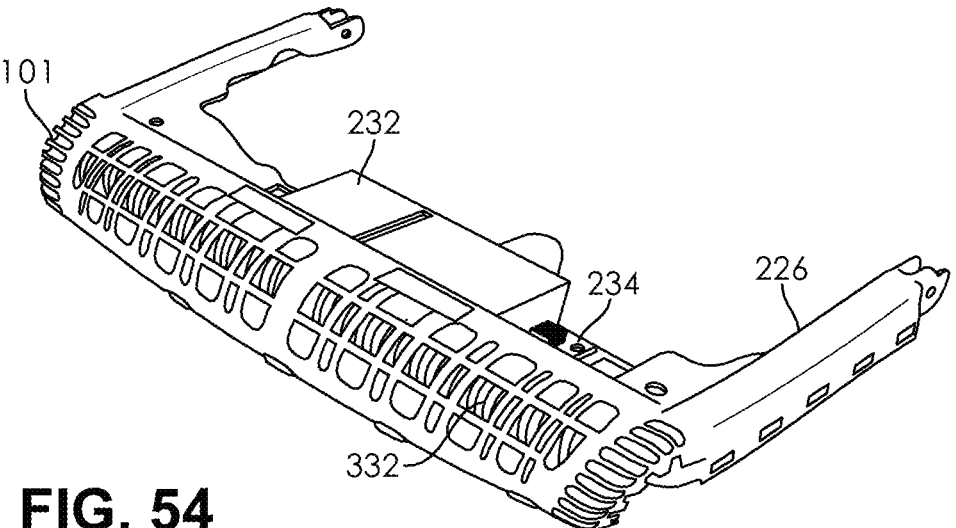
FIG. 54 is an upper perspective view of one embodiment of a flexible main member in a retracted condition, a trim ring and upper and lower slide members.

The flexible main member 101 has been described as integrally formed with the main support portion 50 of the seat base substrate 14. However, in some cases, it may be possible to connect the flexible main member 101, the pusher 332, the upper and lower slides 232, 234 and/or the trim ring 226 to a traditional set base substrate to provide related functionality. Just these structures in the extended and retracted positions are shown in FIGS. 53 and 54, respectively.

One mode of operation may comprise some or all of the following steps. Starting from the retracted position, the upper slide 232 may be at least partially overlapped with the lower slide 234. The motor 268, whether it be from manual operation by the user, or automated operation, such as by the occupant sensing system 140, may be engaged. The motor 268 rotates the pinion gear 312, which is engaged with the rack 308 on the upper slide 232, causing the upper slide 232 to translate with respect to the lower slide 234.

The slide rails 274, 276 of the upper slide 232 translate, or slide, within the slide tabs 240 of the lower slide 234. In addition, the second slot wall 298 of the upper slide 232 slides, or translates, in the slot 260 between the upstanding wall 254 and the first slot wall 256. The slide rails 274, 276 and slide tabs 240, as well as the first and second slot walls 256, 298 permit relative movement of the upper and lower slides 232, 234 but only in a general longitudinal direction. The structures of the upper and lower slides 232, 234 do not permit lateral or vertical movement of the upper and lower slides 232, 234 with respect to one another.

The pusher 332, being attached to the upper slide 232, translates with the upper slide 232. The pusher 332 pushes against the flexible main member 101, which is in a curled position. The pusher 332 causes the flexible main member 101 to at least partially uncurl. The degree to which the flexible main member 101 uncurls is a function of how far the pusher 332 has been moved in the general longitudinal direction.

Figure 59:
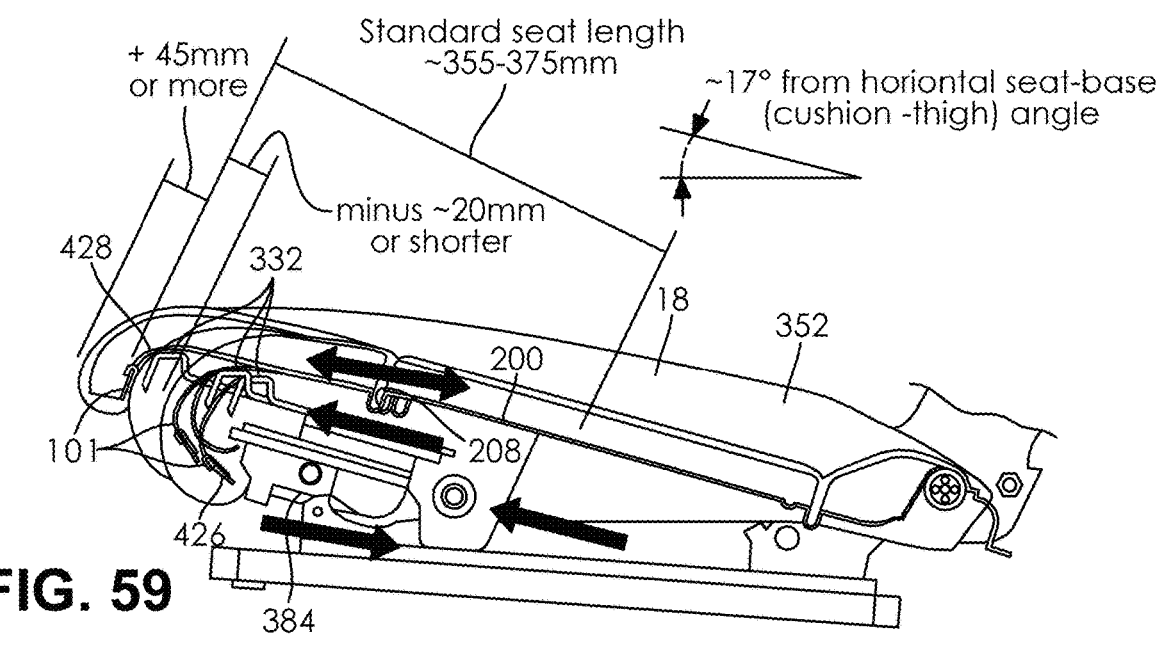
FIG. 59 is a cut away side view of one embodiment of a seat base assembly showing both an extended condition and a retracted condition.

For example, FIG. 59, depicts one embodiment showing the flexible main member 101 having a first curled position 426 in the retracted position. As can be appreciated from the same figure, the flexible main member 101 changes its shape from a general C-shape in the retracted position to a general J-shape in a second, extended position 428. Thus, the flexible main member 101 extends not only in the longitudinal direction, but it also changes shape at the same time.

As the pusher 332 uncurls the flexible main member 101, the spring members 396, being attached to the flexible main member 101, are at least partially drawn out of their spring containers 398, but they are urging the flexible main member 101 back to a curled static position 426.

A seat base 8 with a seat cover 18, as shown in FIGS. 55-58, schematically depicts some possible fore and aft, or longitudinal, ranges of motion. By way of one example, the seat base 8 may retract approximately 20-40 mm shorter than a standard seat. By way of a further example, the seat base 8 may extend approximately 45-55 mm longer than a standard seat. In the industry, a standard trimmed seat may have a length of approximately 355 to 375 mm.

From the foregoing it can be readily appreciated that the seat base 8 can comfortably accommodate a wider range of potential occupants compared with a standard seat. For example, by its adjustability, the seat base 8 may accommodate at least a female occupant in the fifth percentile of height and weight.

Figure 55:
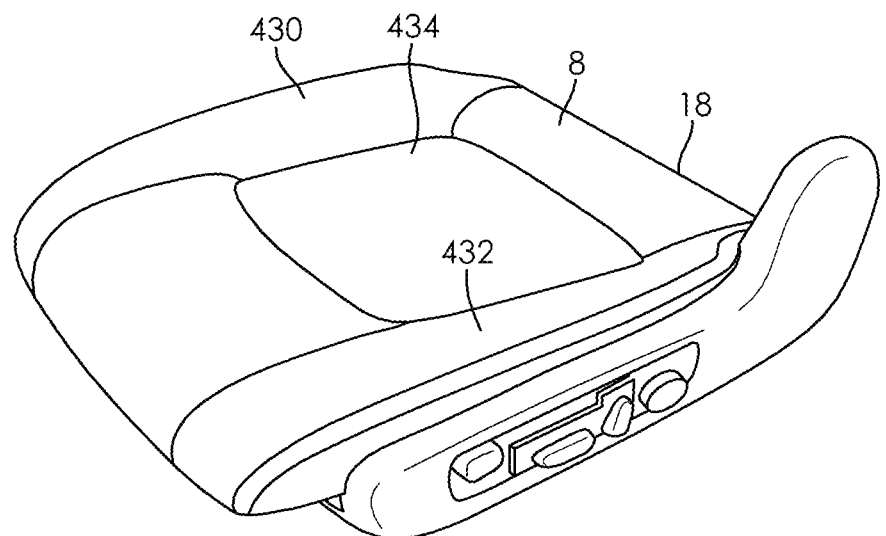
FIG. 55 is an upper perspective view of one embodiment of a seat base assembly in an extended condition.
Figure 56:
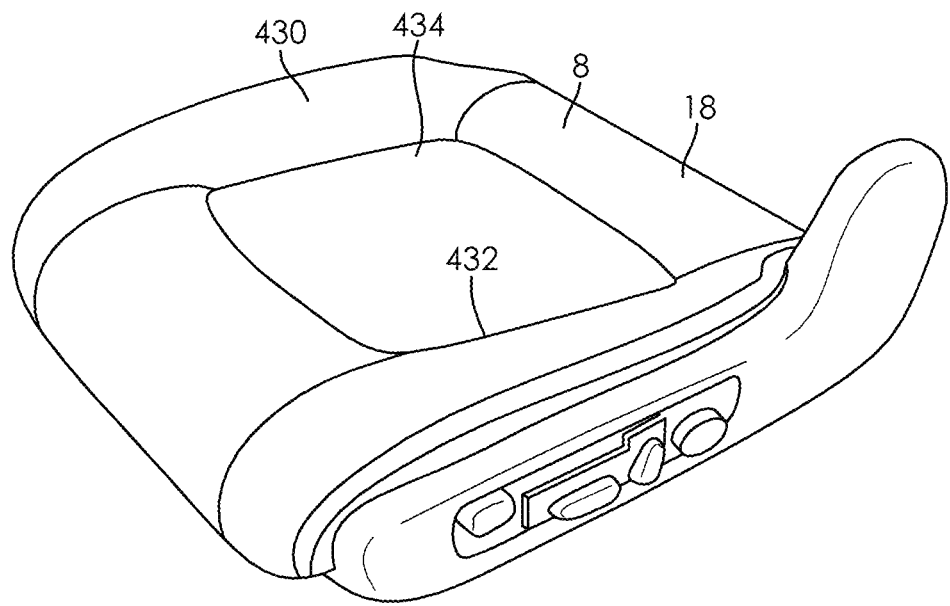
FIG. 56 is an upper perspective view of one embodiment of a seat base assembly in a retracted condition.
Figure 57:
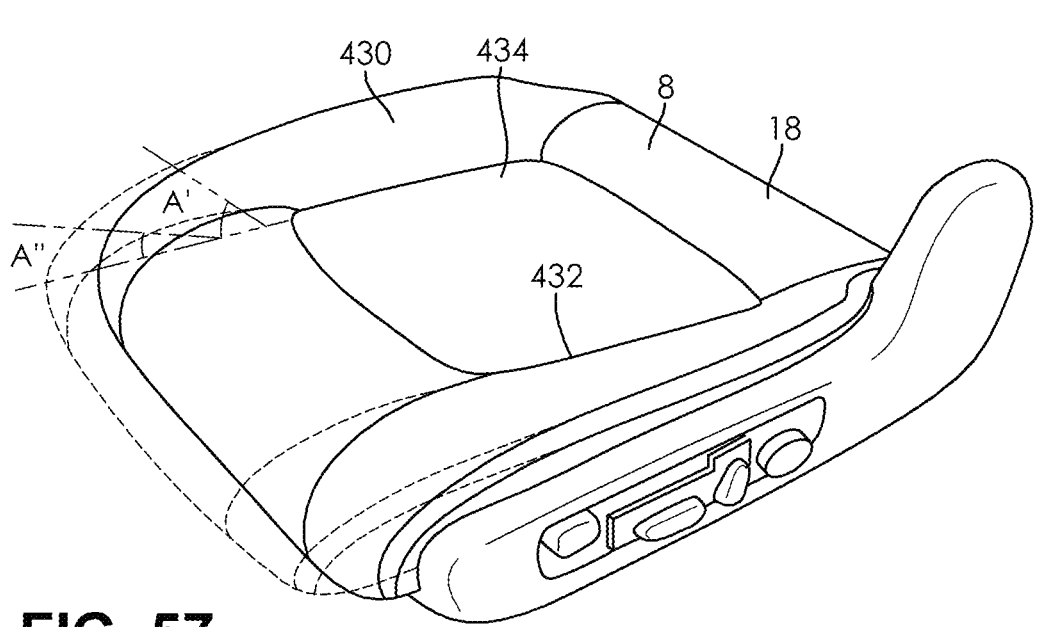
FIG. 57 is an upper perspective view of one embodiment of a seat base assembly showing both an extended condition and a retracted condition.
Figure 58:
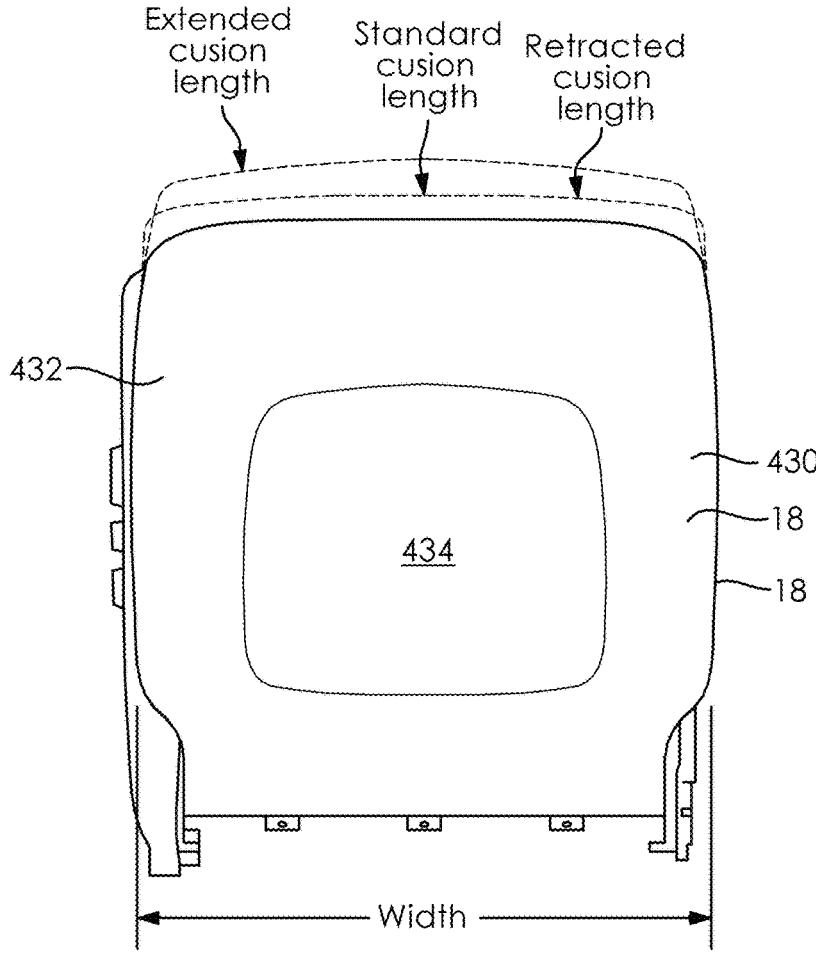
FIG. 58 is an upper plan view of one embodiment of a seat base assembly showing both an extended condition and a retracted condition.

As may be appreciated from FIGS. 55-57, the left and or right bolster portion 430, 432 of a seat base 8 may also move with the aforementioned adjustment. In other words, the bolster portions 430, 432 may move simultaneously with the flexible main member 101. In these schematic figures it can be appreciated that in an extended position one or both of the bolster portions 430, 432 may change their angle A', A" from their position compared with a retracted position. For example, the angle A', A" each bolster 430, 432 presents to a center portion 434 of the seat base 8 may decrease as the seat base 8 extends. Conversely, the angle A', A" of the bolsters 430, 432 may increase and the bolsters 430, 432 move upwardly with respect the center portion 434 of the seat base 8 when the flexible main member 101 moves to a retracted position. Thus, the seat base 8 may alter its contour both fore and aft and side to side to accommodate users of different sizes and shapes.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

The invention claimed is:

1. A seat, comprising:
a seat base substrate for suspension and support comprising a flexible main member;
a drive mechanism comprising a lower slide and an upper slide, wherein said upper slide selectively moves with respect to the fixed lower slide via a rack and pinion system;
a pusher releasably attached to the upper slide, wherein the pusher contacts the flexible main member; and
a trim ring attached to the lower slide, wherein a channel extends within at least the flexible main member, wherein the channel has at least one retention feature for seat trim integrally formed therewith.

2. The seat of claim 1, wherein the trim ring has two arms connected to a seat base frame portion, wherein each arm has a plurality of trim apertures adapted to receive trim hooks therein, wherein said trim hooks are attached to a seat trim extending over the seat base substrate.

3. The seat of claim 1, wherein at least one spring housing is attached to the trim ring, wherein the at least one spring housing is adapted to hold a portion of a constant force spring therein, wherein the spring housing has spring guides.

4. The seat of claim 3, wherein a spring has a first end portion at least partially coiled within the at least one spring housing, another portion adapted to selectively move within the spring guides, and a second end portion connected to the flexible main member.

5. The seat of claim 1, wherein the pusher comprises a modular design with at least one button adapted to selectively fit within at least one attachment feature on the upper slide.

6. The seat of claim 1, wherein the lower slide comprises
a motor housing and a first slot wall extending generally parallel a motor housing wall, wherein a gap exists between the motor housing wall and the first slot wall, and
a plurality of slide tabs.

7. The seat of claim 6, wherein the upper slide comprises
a slide rail adapted to be at least partially received with the slide tabs;
a plurality of attachment features comprising slots on a front of the upper slide;
a second slot wall adapted to selectively move in the gap between the motor housing wall and the first slot wall;
a step in an upper wall of the upper slide, wherein the step is comprised of a plurality of teeth forming a rack of the rack and pinion system.

8. The seat of claim 7, wherein a pinion gear is engaged with the plurality of teeth on the rack, and a pinion shaft, attached to the pinion gear, is located through the lower slide to a motor located in the motor housing of the lower slide.

9. The seat of claim 1, wherein the seat base substrate and flexible main member are unitary, one-piece and integrally formed of a flexible material.

10. The seat of claim 1, wherein at least a portion of a front edge portion of the flexible main member has a predisposed downward curl with respect a body portion of the flexible main member.

11. The seat of claim 1, wherein the flexible main member has a plurality of hook apertures integrally formed therein, wherein at least one connector strip has at least one hook formed thereon and is adapted for selective location in one of the hook apertures, wherein seat trim is connected to a body portion of the connector strip to connect the seat trim with the flexible main member.

12. The seat of claim 1, wherein the flexible main member is adapted to have a first generally planar state, a second general J-shape and a third general C-shape.

13. The seat of claim 12, wherein at least one spring metal strip is located in a recess on an upper surface of the flexible main member to assist in holding the third general C-shape.

14. The seat of claim 1, wherein the flexible main member is attached to a seat base frame portion, wherein the flexible main member has a width substantially similar to a width of a cushion member attached thereto.

15. A seat, comprising:

a seat base substrate for suspension and support comprising a flexible main member;

a drive mechanism comprising a lower slide and an upper slide, wherein said upper slide selectively moves with respect to the fixed lower slide via a rack and pinion system;

a pusher releasably attached to the upper slide, wherein the pusher contacts the flexible main member; and a trim ring attached to the lower slide, wherein the lower slide comprises:

a motor housing and a first slot wall extending generally parallel a motor housing wall, wherein a gap exists between the motor housing wall and the first slot wall, and a plurality of slide tabs.

16. The seat of claim 15, wherein the upper slide comprises a slide rail adapted to be at least partially received with the slide tabs;

a plurality of attachment features comprising slots on a front of the upper slide;

a second slot wall adapted to selectively move in the gap between the motor housing wall and the first slot wall;

a step in an upper wall of the upper slide, wherein the step is comprised of a plurality of teeth forming a rack of the rack and pinion system.

17. The seat of claim 16, wherein a pinion gear is engaged with the plurality of teeth on the rack, and a pinion shaft, attached to the pinion gear, is located through the lower slide to a motor located in the motor housing of the lower slide.

18. The seat of claim 15, wherein a channel extends within at least the flexible main member, wherein the channel has at least one retention feature for seat trim integrally formed therewith.

19. A seat, comprising:

a seat base substrate for suspension and support comprising a flexible main member;

a drive mechanism comprising a lower slide and an upper slide, wherein said upper slide selectively moves with respect to the fixed lower slide via a rack and pinion system;

a pusher releasably attached to the upper slide, wherein the pusher contacts the flexible main member; and a trim ring attached to the lower slide, wherein the flexible main member is adapted to have a first generally planar state, a second general J-shape and a third general C-shape, wherein at least one spring metal strip is located in a recess on an upper surface of the flexible main member to assist in holding the third general C-shape.

20. The seat of claim 19, wherein a channel extends within at least the flexible main member, wherein the channel has at least one retention feature for seat trim integrally formed therewith.

* * * * *